(12) United States Patent
Allcock et al.

(10) Patent No.: US 6,392,008 B1
(45) Date of Patent: May 21, 2002

(54) POLYPHOSPHAZENE POLYMERS

(75) Inventors: Harry R. Allcock; Robbyn Prange, both of State College, PA (US); Christine R. deDenus, Geneva, NY (US); James M. Nelson, Roseville, MN (US); Chester A. Crane, Linden; Walter R. Laredo, Somerville, both of NJ (US); Scott D. Reeves, Marlborough, MA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 09/621,397

(22) Filed: Jul. 21, 2000

Related U.S. Application Data

(60) Provisional application No. 60/144,848, filed on Jul. 21, 1999, provisional application No. 60/144,944, filed on Jul. 21, 1999, provisional application No. 60/144,945, filed on Jul. 21, 1999, provisional application No. 60/144,951, filed on Jul. 21, 1999, and provisional application No. 60/171,327, filed on Dec. 21, 1999.

(51) Int. Cl.$^7$ .............................................. C08G 79/02
(52) U.S. Cl. ....................... 528/399; 528/397; 528/487; 528/491; 525/287; 525/326.5; 525/333.3; 525/538; 525/540
(58) Field of Search ................................ 528/399, 397, 528/487, 491; 525/287, 326.5, 333.3, 538, 540

(56) References Cited

U.S. PATENT DOCUMENTS

| | | | |
|---|---|---|---|
| 5,457,160 A | * | 10/1995 | Allcock et al. ............. 525/188 |
| 5,698,664 A | * | 12/1997 | Allcock et al. ............. 528/399 |
| 5,914,388 A | * | 6/1999 | Allcock et al. ............. 528/399 |

OTHER PUBLICATIONS

Hayashi et al. Poly(alkylene oxides) and their manufacture using metal free polymerization initiators'. Chem Abstract 129: 331163, Oct. 13, 1998.*

Davankov et al. "Sorbents for removing toxicants from blood or plasma, and method of producing same", Chem Abstract 127: 322834, Oct. 2, 1997.*

White et al. "the thermal properties of polyphosphazenes synthesized by the anionically initiated polymerization of phosphoranimines". Chem Abstract 123: 229597. 1995.*

White et al., "Themal degradation of polyphosphazene homopolymers and copolymers prepared by the anionic polymerization of phosphoranimines". Chem Abstract 123: 10487. 1995.*

White et al. "Morphology of (methoxyethoxy/trifluoroethoxy) phosphazene copolymers". Chem Abstract 123: 10379. 1995.*

(List continued on next page.)

*Primary Examiner*—Duc Truong
(74) *Attorney, Agent, or Firm*—Holland & Knight LLP

(57) ABSTRACT

Compositions of polyphosphazene-containing polymers and methods of preparation thereof are provided. The disclosed compositions encompass telechelic functionalized polyphosphazenes and a variety of block and graft polyphosphazene-polystyrene, polyphosphazene-polysiloxane, and polyphosphazene-ROMP of norbornene copolymers. Methods for the preparation of such compositions generally involve generation of a polydichlorophosphazene species, attachment of a function group to the resultant polyphosphazene compound, and coupling the functionalized polyphosphazene with a corresponding organic or inorganic polymers or polymerizing the functionalized polyphosphazene with corresponding organic molecules.

35 Claims, 10 Drawing Sheets

OTHER PUBLICATIONS

Matyjasewski et al. "Synthesis of polyphosphazene random copolymers bearing alkoxyethoxy and trifluoroethoxy functional groups". Chem Abstract 121: 206164. 1993.*

Matyjaszewski et al. "Synthesis of polyphosphazene random and block copolymers". Chem Abstract 120: 135294. 1993.*

Matyjaszewski et al. "Synthesis of polyphosphazene copolymers using anionic initiators". Chem Abstract 120: 31355. 1992.*

Matyjaswewski et al. "Synthesis of polyphosphazene block copolymers bearing alkoxyethoxy and trifluoroethoxy groups". Chem Abstract 119: 250651. 1993.*

* cited by examiner

POLYPHOSPHAZENE POLYMERS

CROSS-REFERENCE TO RELATED APPLICATIONS

Priority is claimed to U.S. Provisional Applications No. 60/144,848; No. 60/144,944; No. 60/144,945; and No. 60/144,951; all filed Jul. 21, 1999, as well as to U.S. Provisional Application No. 60/171,327, filed Dec. 21, 1999.

STATEMENT REGARDING FEDERALLY SPONSORED RESEARCH

The government has certain rights in this invention by virtue of grants from Federal Aviation Administration (Grant No. 99-G-0013) and National Science Foundation of Polymers Program (Grant No. DMR-9812389).

BACKGROUND OF THE INVENTION

The present invention relates generally to copolymers containing components of polyphosphazene as part of the copolymer backbone or as a sidegroup.

Polyphosphazene-containing polymers have been used in applications in the field of biomedical materials, conductive polymers, and elastomers. Polyphosphazene-containing polymers are also of general interest because of their capability to combine with another polymer, either organic or inorganic, incorporating the properties and advantages of the two polymer components without sacrificing the overall chemical, physical, and mechanical properties of each component. For instance, the synthesis of hybrid block and graft copolymers of polyphosphazenes and polystyrene is a way to combine the attributes of both polymers and generate new properties. Many of the valuable properties of the respective phosphazene and styrene homopolymers can be combined without sacrificing the overall solid state or solution properties of both polystyrene and polyphosphazene polymers. For example, block or graft copolymers of polyphosphazenes and polystyrene have improved fire resistance compared to polystyrene alone.

Thus far, efforts to combine polyphosphazenes with another polymer backbone to form a copolymer to take advantage of the attributes of each component has had only very limited success. For instance, the incorporation of organosiloxanes and polyphosphazenes into one material, although successful, has not resulted in linear phosphazene-siloxane block copolymers combining the attributes of the two inorganic backbone systems. Moreover, until recently, the preparation of block copolymers containing polyphosphazenes, has been limited to species with two phosphazene components. The synthesis of telechelic polyphosphazenes which may be used to couple with preformed organic polymers has proved to be difficult.

Traditionally, block copolymers have been synthesized via sequential polymerization of different monomers. However, the limited number of compatible initiating monomers places limits on the number of copolymers that can be synthesized by the sequential method. It therefore would be advantageous to develop an approach that can readily incorporate polyphosphazenes along with other polymeric systems to yield copolymers having the advantages of both polymeric components.

Therefore, it is an object of the present invention to provide methods for the synthesis of telechelic polyphosphazenes for the purposes of making polyphosphazene-containing organic-inorganic copolymers.

It is another object of the present invention to provide synthetic methods for the preparation of polymeric compositions that contain a polyphosphazene component.

It is another object of the present invention to provide methods for combining a polyphosphazene backbone with another polymeric backbone to form new copolymers.

It is a further object of the present invention to provide a method to modify polyphosphazenes with various functional groups to provide polyphosphazene polymers with different chemical and physical properties.

It is still another object of the present invention to provide methods to prepare polyphosphazene compositions which are readily incorporated into other polymeric compositions.

SUMMARY OF THE INVENTION

Compositions of polyphosphazene-containing polymers and methods of preparation thereof are provided. The compositions may contain either organic or inorganic components. A large variety of organic side groups can be further incorporated as sidegroups on the polyphosphazene to tailor the properties of these materials. Exemplary polymeric compositions which can be incorporated include polystyrene, polysiloxanes, polynorbornene, poly(methyl methacrylate), polyolefins, polydienes, and polyethylenes.

Methods for the preparation of compositions of polyphosphazene-containing polymers generally involve the steps of generation of a poly(dihalophosphazene) species, attachment of a functional group to the resultant polyphosphazene compound, and coupling the functionalized polyphosphazene with a corresponding organic or inorganic polymer or polymerizing the functionalized polyphosphazene with corresponding organic molecules. A large number of polyphosphazene-containing polymers can be prepared accordingly.

The polyphosphazene compositions disclosed are useful as elastomers, optical materials, electrically conductive materials, biomedical materials, compatibilizing agents, surfactants, additives for coatings, and as flame retardants.

DETAILED DESCRIPTION OF THE INVENTION

Figure 1:
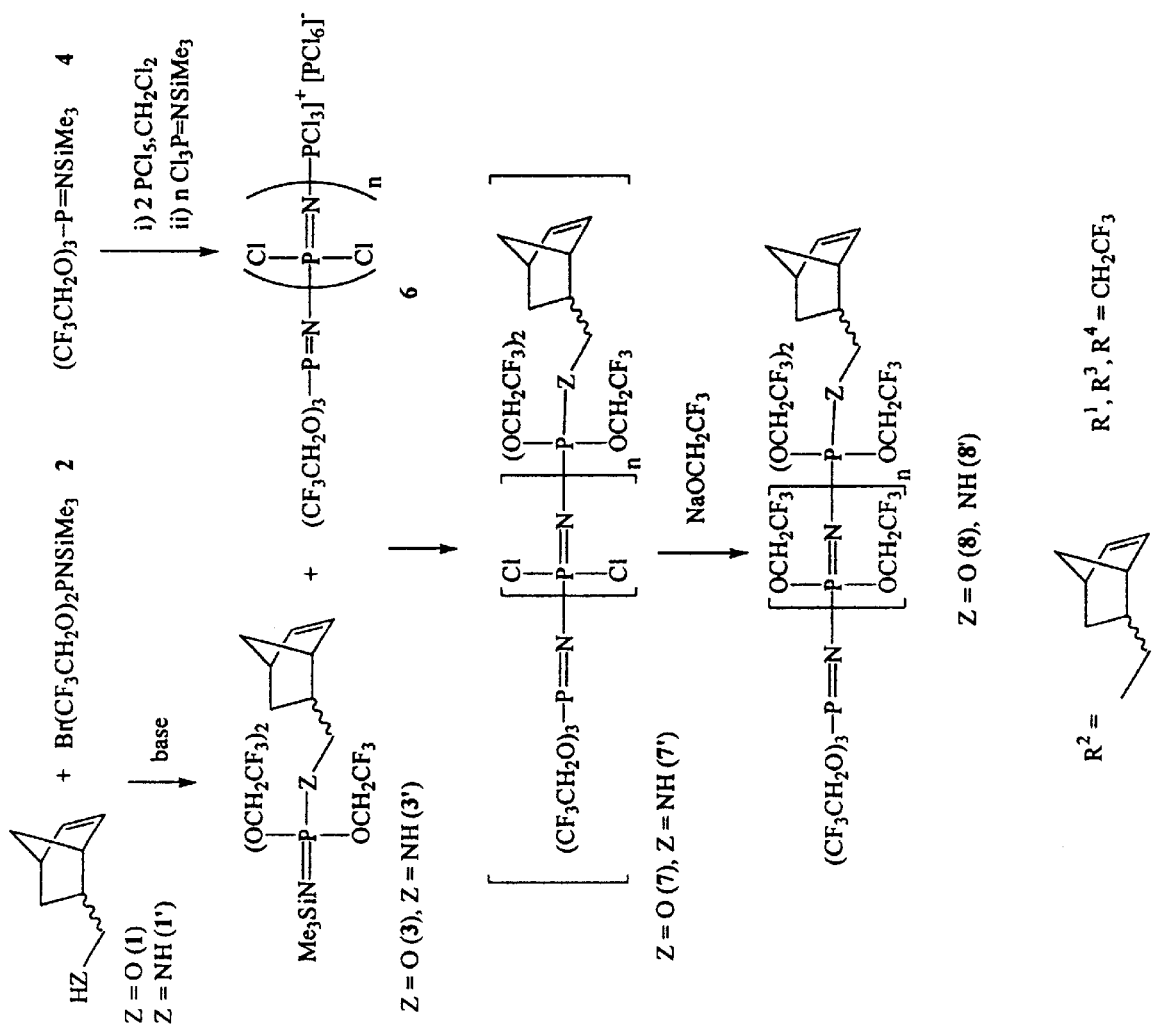
FIG. 1 illustrates one embodiment of the method for the preparation of monotelechelic norbornenyl polyphosphazenes.

Methods have been developed for making a variety of useful polyphosphazene-containing polymers. Examples of the polymers which can be made include telechelic polyphosphazenes, polyphosphazene-poly-olefin copolymers, polyphosphazene-ROMP polymers of norbornene, and polyphosphazene and polysiloxane copolymers.

I. Definitions

The term "living polymer" as used herein means to a polymer molecule which has an active terminal unit which is capable of reacting or polymerizing monomer.

The term "copolymer" as used herein means a polymer having at least two polymeric backbone components. The term "graft polymer" as used herein refers to a polymer molecule which has polymer chains as pendent groups along a polymer backbone. The term "block copolymer" as used herein means a polymer combining two or more polymeric components having a structure such as A-B, A-B-A, B-A-B, or A-B-C.

The term "telechelic" as used herein refers to a polymer molecule which contains reactive terminal units at either one or two ends of the polymer. "Monotelechelic" refers to the attachment of a functional group to one end of the polymer while "ditelechelic" refers to the attachment of functional groups to both ends of the polymer.

The term "PDI" as used herein refers to the polydispersity index in reference to the molecular weights of the polymers.

II. Compositions with Polyphosphazene Backbones

Copolymers containing segments of polyphosphazenes, as either backbone segments or pendent side chains, are prepared with a variety of polymers. Representative suitable polymers include polystyrene, polynorbornene, polysiloxanes, poly(methyl methacrylate), and polyolefins. The polymer compositions described herein can be generalized in the formula

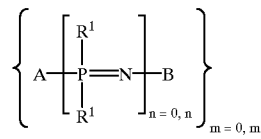

wherein each specific composition is discussed in detail as follows.

1. Polymers with Telechelic Terminal Groups

A. Polymers of Formula 1A

Polymers of formula 1A, with di- or monotelechelic terminal groups provide a functionalized polyphosphazene capable of further reactions that allow the incorporation of phosphazenes and other polymeric systems into one material:

Formula 1A

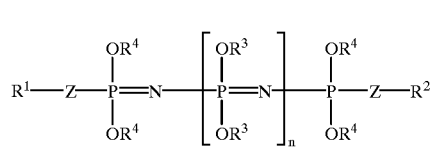

where $R^1$ and $R^2$ taken independently can be $CF_3CH_2$, Ph, MeOPh, BOC-NH$(CH_2)_2$, $(^t\text{-}Bu)Me_2SiO(CH_2)_5$, allyl, vinyl, BrPh, 1-naphthyl, 1-naphthoxy, and norbornenyl groups;

where $R^3$ and $R^4$ taken independently can be $CF_3CH_2O$, $CCl_3CH_2$, Ph, alkyl, $CF_3$, and Br; and where Z is either O or NH.

Preferred polymers are those where the $R^1$ and $R^2$ groups are either vinyl aniline, allyl amine, phenyl, methoxyphenyl, $^t\text{-}BocNH(CH2)_2$, $^t\text{-}BuMe_2SiO(CH_2)_5$, 1-naphthyl, or norbornenyl groupings, and $R^3$ and $R^4$ groups are $CF_3CH_2O$.

B. Polymers of Formula 1B

Polymers with Formula 1B which are block polyphosphazenes with two naphthoxy groups which may be used as electrically conductive materials or optical materials are provided:

Formula 1B

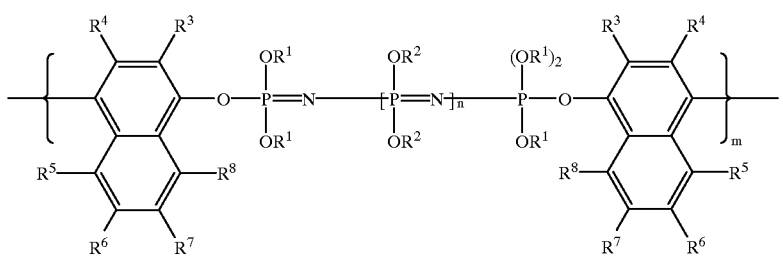

where $R^1$ and $R^2$ taken independently can be $CX_3CH_2$ in which X is a halogen group, Ph, alkyl, $CF_3$, and alkoxy; and where $R^3$, $R^4$, $R^5$, $R^6$, $R^7$, and $R^8$ taken independently can be H, halogen groups, $CH_3$, $CH_3O$, and $CH_3CH_2O$.

The preferred polymers are those where $R^1$ is $CF_3CH_2$, $R^2$ is Ph, and $R^3$, $R^4$, $R^5$, $R^6$, $R^7$, and $R^8$ are H groups.

2. Polyphosphazene-poly-olefin Copolymers

A. Polymers of Formula 2A

Polymers of Formula 2A are provided which are polyphosphazene-polystyrene block polymers:

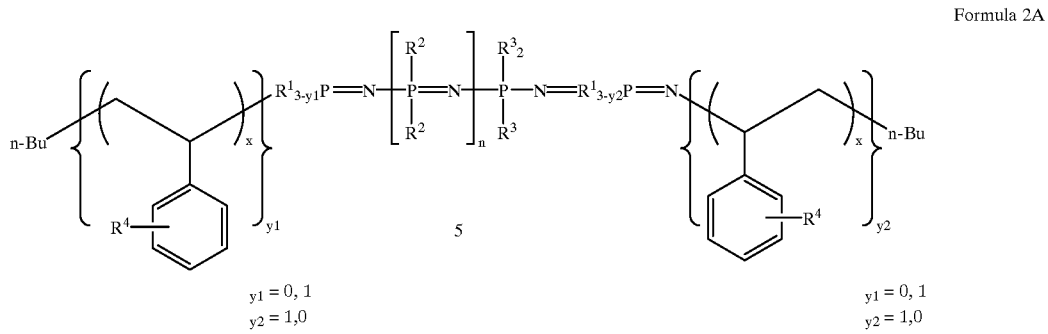

Formula 2A where $R^1$ can be Ph, 1-naphthyl, and XPh in which X is halogen groups in either a p, o or m position;

where $R^2$ and $R^3$ taken independently can be PhO, $CX_3CH_2O$ in which X is halogen groups, and alkoxy groups;

where $R^4$ is in either a p, o or m position and is either H, $CH_3$, or X which is a halogen group; and where $y_1$ and $y_2$ are different and are either 1 or 0.

The preferred polymers are those where $R^1$ is Ph, $R^2$ and $R^3$ are either PhO or $CF_3CH_2O$, $R^4$ is H, and $y_1$ and $y_2$ are different and are either 0 or 1.

B. Polymers with Formula 2B

Polymers of Formula 2B are provided which are polyphosphazene-polystyrene graft polymers:

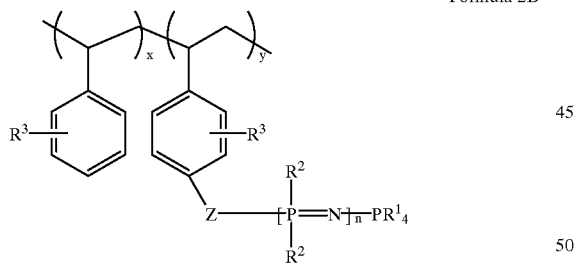

Formula 2B where $R^1$ and $R^2$ taken independently can be PhO, $CX_3CH_2O$ in which X is a halogen group, and alkoxy groups;

where $R^3$ is in either a p, o or m position and is either H, $CH_3$, or X which is a halogen group; and where Z is either an O or NH group.

The preferred polymers are those where $R^1$ is a phenyl group, $R^2$ is either a $CF_3CH_2$ or PhO group, $R^3$ is H, and Z is an NH group.

C. Polymers with Formula 2C

Polymers of Formula 2C are provided which are diblock polyphosphazene-polystyrene copolymers in which the two polymeric blocks are bridged by a silyl grouping:

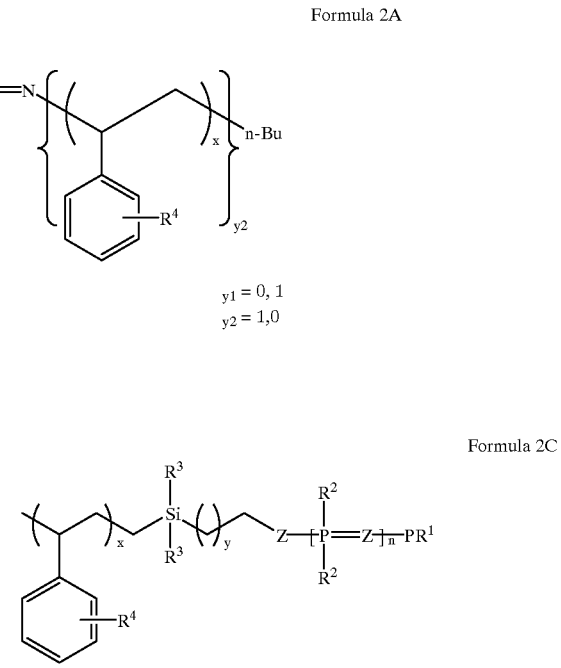

Formula 2C where $R^1$ and $R^2$ taken independently can be PhO, $CX_3CH_2O$ in which X is a halogen group, and alkoxy groups;

where $R^3$ can be $CH_3$, $CH_3CH_2$, $CH_3CH_2CH_2$, or $CH_3CH(CH_3)$;

where $R^4$ is in either a p, o or m position and can be H, $CH_3$, and X which is a halogen group; and where Z is either an O or NH group.

The preferred polymers are those where $R^1$ and $R^2$ are PhO and $CF_3CH_2O$, $R^3$ is $CH_3$, and $R^4$ is H.

3. Polyphosphazene-ROMP Polymers of Norbornene

A. Polymers with Formula 3A

Polymers with Formula 3A which are polyphosphazene-ROMP polymers of norbornene are provided:

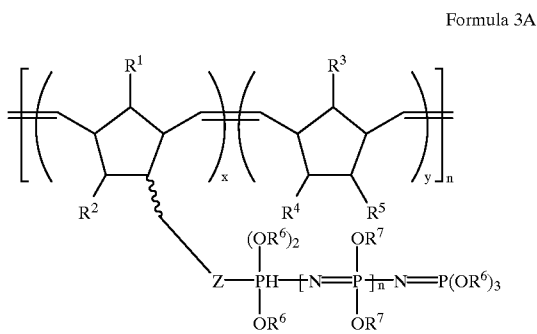

Formula 3A where $R^1$, $R^2$ and $R^3$ taken independently can be H, $CH_3$, $CH_3CH_2$, $CH_3CH_2CH_2$, and X which is a halogen group;

where $R^6$ can be Ph, $CX_3CH_2$ in which X is a halogen group, and alkoxy groups;

where $R^7$ can be $CH_3$, $CH_3CH_2$, $CH_3CH_2CH_2$, and $CH_3CH(CH_3)$; and where Z is either an O or NH group.

The preferred polymers are those where $R^1$, $R^2$, $R^3$, $R^4$, and $R^5$ are H groups, $R^6$ is $CF_3CH_2$, and Z is an O group.

B. Polymers with Formula 3B

Polymers with Formula 3B which are polymers from ROMP of Norbornene with phosphazene functional groups are provided:

Formula 3B

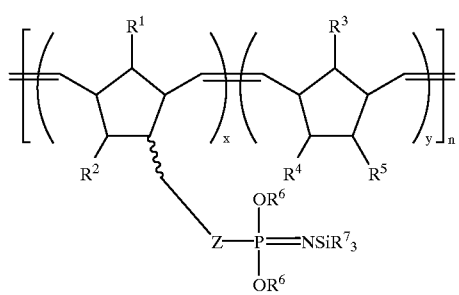

where $R^1$, $R^2$, $R^3$, $R^4$, and $R^5$ taken independently can be H, $CH_3$, and X which is a halogen group;

where $R^6$ and $R^7$ taken independently can be Ph, $CX_3CH_2$ in which X is a halogen group, and alkyl groups;

and where Z is either an O or NH group.

The preferred polymers are those where $R^1$, $R^2$, $R^3$, $R^4$, and $R^5$ are H groups, $R^6$ and $R^7$ are $CF_3CH_2$ groups, and Z is an O or NH group.

4. Polyphosphazene and Polysiloxane Copolymers

A. Polymers with Formula 4A

Polymers of Formula 4A which are polyphosphazene and polysiloxane copolymers are provided:

Formula 4A

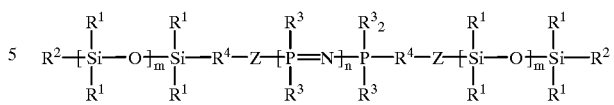

where $R^1$ can be PhO, $CX_3CH_2O$ in which X is a halogen group, and alkoxy groups;

where $R^2$ can be a $-CH_2CH_2-$, and $-CH_2CH_2CH_2-$ group;

where $R^3$ can be $CH_3$, $CH_3CH_2$, $CH_3CH_2CH_2$, and $CH_3CH(CH_3)$; and where Z is either an O or NH group.

The preferred polymers are those where $R^1$ is $CF_3CH_2$, $R^2$ is a $CH_2CH_2$ group, $R^3$ is $CH_3$, and Z is an O or NH group.

B. Polymers with Formula 4B

Polymers of Formula 4B which are polyphosphazene and polysiloxane copolymers are provided:

Formula 4B

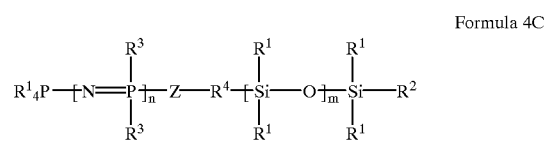

where $R^1$ and $R^2$ taken independently can be $CH_3$, $CH_3CH_2$, $CH_3CH_2CH_2$, and $CH_3CH(CH_3)$;

where $R^3$ can be PhO, $CX_3CH_2O$ in which X is a halogen group, an alkoxy group, a 1-naphthoxy group, $CF_3$, and $CH_3$;

where $R^4$ can be $CH_2$, $CH_2CH_2$, $CH_2CH_2CH_2$, and $-(CH_2)_xOCH_2CH_2-$ where x is an integer selected from the group consisting of 1, 2 and 3; and where Z is either an O or NH group.

The preferred polymers are those where $R^1$ is $CH_3$, $R^2$ is a $CH_3CH(CH_3)$ group, $R^3$ is $CF_3CH_2O$, $R^4$ is $-(CH_2)_3OCH_2CH_2-$, and Z is an O or NH group.

C. Polymers with Formula 4C

Polymers of Formula 4C which are polyphosphazene and polysiloxane copolymers are provided:

Formula 4C

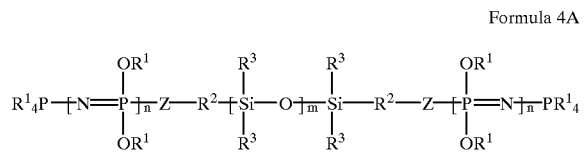

where $R^1$ and $R^2$ taken independently can be $CH_3$, $CH_3CH_2$, $CH_3CH_2CH_2$, and $CH_3CH(CH_3)$;

where $R^3$ can be PhO, $CX_3CH_2O$ in which X is a halogen group, alkoxy groups, 1-naphthoxy, $CF_3$, and $CH_3$;

where $R^4$ can be $CH_2$, $CH_2CH_2$, $CH_2CH_2CH_2$, and $-(CH_2)_xOCH_2CH_2-$ where x is an integer selected from the group consisting of 1, 2 and 3; and where Z is either an O or NH group.

The most preferred polymers are polymers where $R^1$ is $CH_3$, $R^2$ is a $CH_3CH(CH_3)$ group, $R^3$ is $CF_3CH_2O$, $R^4$ is $-(CH_2)_3OCH_2CH_2-$, and Z is an O or NH group.

III. Synthesis of the Polymers

The polymers of Formula 1A–B, 2A–C, 3A–B, and 4A–C can be prepared using the synthetic reactions and techniques described herein. The reactions are performed in solvents suitable to the reagents and materials employed and suitable for the transformation being effected. Depending upon the synthetic route selected and the functionality of the starting material or intermediates, the appropriate protection groups and deprotection conditions available in the art of organic and inorganic synthesis may be utilized in the synthesis of the polymers.

Polymers of Formula 1A–B, 2A–C, 3A–B, and 4A–C can be synthesized, for example, using the routes illustrated in FIGS. 1–10 and the methods described in the Examples herein.

1. Synthesis of Polyphosphazene Polymers of Formula 1

Mono- or di-telechelic polyphosphazenes can be prepared through terminating the living poly(dichloro)phosphazenes with an appropriate amount of chosen non-halogenated phosphoranimines. In one embodiment, monotelechelic polyphosphazenes have the formula $R(CF_3CH_2O)_2PNSiMe_3$ where R can be a functionalized amine or alcohol.

Figure 2:
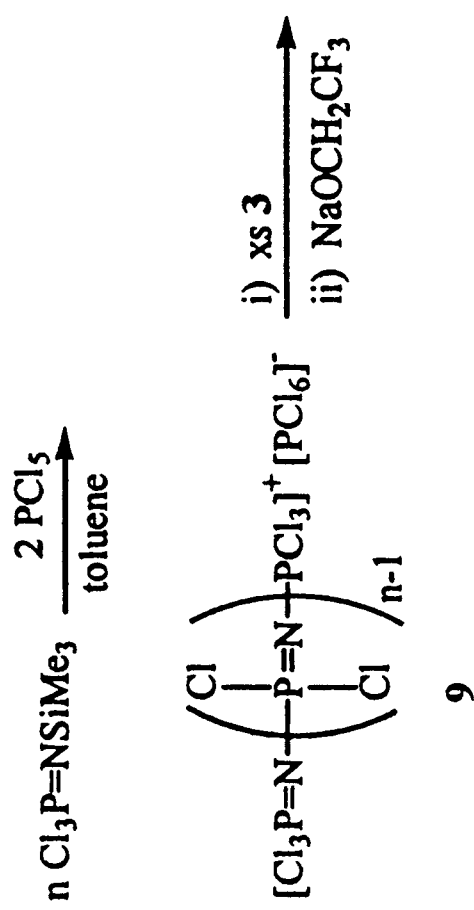
FIG. 2 illustrates one embodiment of the method for the preparation of ditelechelic norbornenyl polyphosphazenes.
Figure 2:
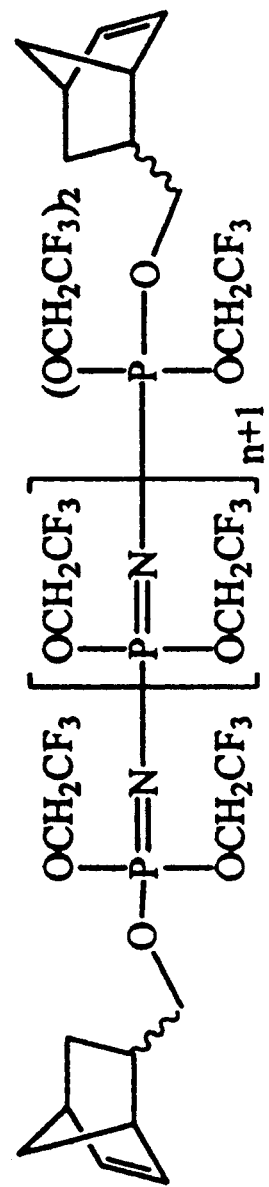
Figure 2:
Figure 3:
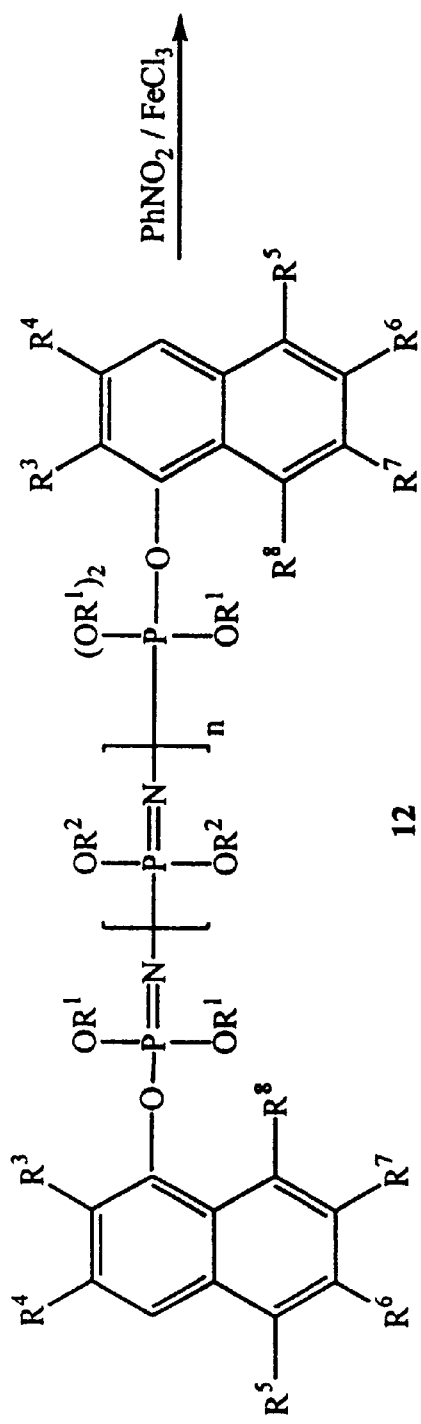
FIG. 3 illustrates one embodiment of the method for the preparation of polynaphthoxyl-polyphosphazene block copolymers.
Figure 3:
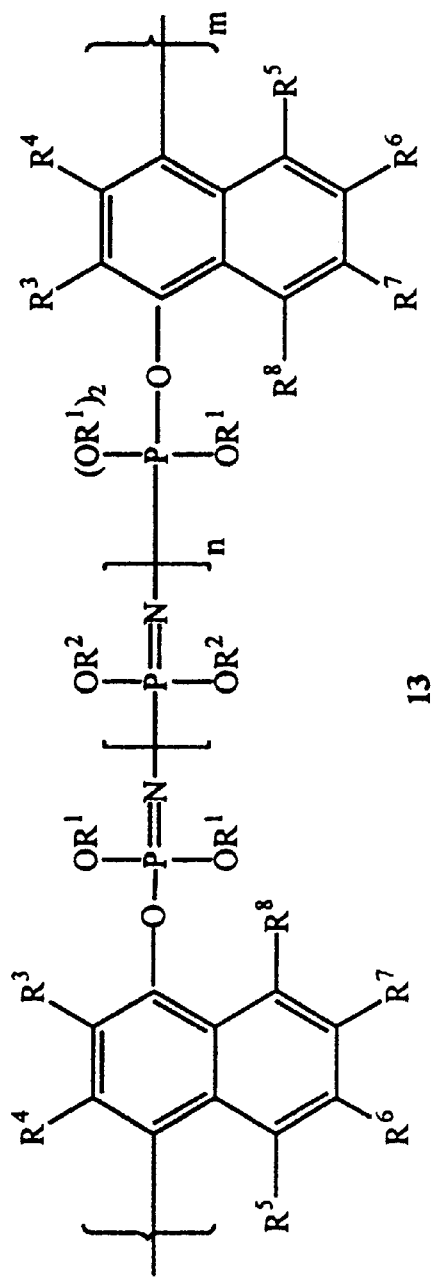
Figure 4:
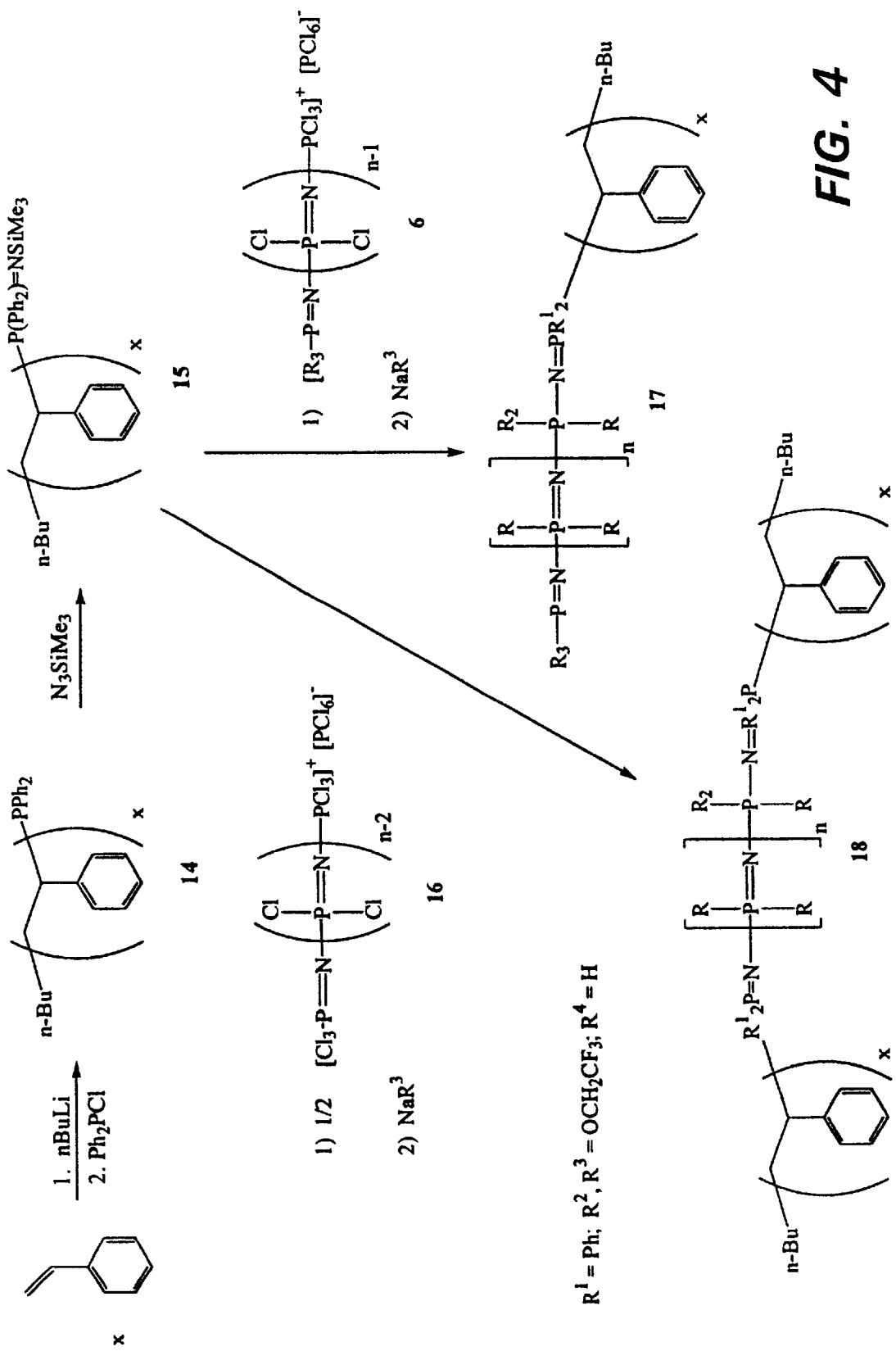
FIG. 4 illustrates one embodiment of the method for the preparation of a polystyrene-polyphosphazene block copolymer.

Polymers of Formula 1A with $R^1$ (or $R^2$ in the alternative) being norbornenyl and $R^2$ (or $R^1$ in the alternative), $R^3$, and $R^4$ being $CF_3CH_2$ can be synthesized as outlined in FIGS. 1–2. First, norbornenyl phosphoranimines (3, 3') were generated through coupling 5-hydroxymethyl bicyclo[2.2.1] hept-2-ene (1) or 5-aminomethyl bicyclo[2.2.1]hept-2-ene (1') with a halophosphoranimine such as $Br(CF_3CH_2O)_2$ $PNSiMe_3$ (2) in an solvent such as tetrahydrofuran (THF) and in the presence of a base. Then, two molar equivalents of $PX_5$ such as $PCl_5$ were allowed to react with the phosphoranimine $(CF_3CH_2O)_3P=NSiMe_3$ (4) at a cold temperature, such as −78° C., in an organic solvent, such as $CH_2Cl_2$, to generate the ionic species $[(CF_3CH_2O)_3P=N-PCl_3]^+[PCl_6]^-$ (5). Addition of a trihalophosphoranimine, such as $Cl_3P=NSiMe_3$, to this reaction mixture induces polymerization to living poly(dichlorophosphazene) (6) with chain lengths that can be controlled by the variation of monomer to initiator ratio. Monotelechelic polydichlorophosphazene (7, 7') can be obtained by addition of an appropriate amount of the norbornenyl phosphoranimine (3 or 3') to terminate a living polymer such as poly (dichlorophosphazene) chains (6). Macromolecular replacement of the halogen atoms in $[X_2P=N]_n$ such as Cl in the $[Cl_2P=N]_n$ units by an amine or alkali metal alkoxide or phenoxide such as $NaOCH_2CF_3$ generated the hydrolytically stable, halogen-free macromonomers (8, 8'). Similarly, ditelechelic norborneyl polyphosphazene with $R^3$ and $R^4$ being $CF_3CH_2$ groups and Z being an O group (10) can be easily prepared by terminating 9 with an excess amount of 3 or 3'.

Poly[ditelechelic 1-naphthoxyl polyphosphazenes] of Formula 1B can be synthesized by a polymerization reaction in the presence of a catalyst such as $FeCl_3$ and $PhNO_2$. In one embodiment, a composition of Formula 1B with $R^1$ being a $CF_3CH_2O$ group, $R^2$ being a PhO group and $R^3$, $R^4$, $R^5$, $R^6$, $R^7$ and $R^8$ being H groups (13) can be prepared as outlined in FIG. 3. First, the ditelechelic 1-naphthoxypolyphosphazene (12) is prepared by terminating 9 with an appropriate amount, such as 2.2 equivalents, of the naphthoxy phosphoranimine followed by replacement of the halogen atoms such as Cl with trifluoroethoxy. The hydrolytically stable prepolymer, 12, is then allowed to polymerize in the presence of $PhNO_2$ and $FeCl_3$ generates polymer 13.

2. Synthesis of Polymers with Formula 2A–C

Polymers of Formula 2A can be prepared through the termination of living poly(dichlorophosphazenes) with polystyryl phosphoranimines. In one embodiment, polymer compositions of Formula 2A with $R^1$ being a Ph group and $R^2$ and $R^3$ being $CF_3CH_2O$ groups can be prepared according to FIG. 4. First, polystyrene with a terminal phosphine unit is prepared by quenching living polystyrene (14) with a halophosphine such as $Ph_2PCl$. 14 is then treated with $N_3SiMe_3$ to yield the novel polystyryl phosphoranimine (15) in quantitative yield. 15 can be used as a macromolecular terminator in the living polymerization of polyphosphazenes. Similarly, 14 can be quenched by animines or olefin oxides such as ethylene oxide, followed by the addition of halophosphanimines to give respective polystyryl phosphanimes. Diblock copolymers of Formula 2A with $y_1=1$ (or $y_2=1$) and $y_2=0$ (or $y_1=0$), $R^1$ being a Ph group, $R^2$ and $R^3$ being $CF_3CH_2O$ groups (17) can be prepared by the termination of living polyphosphazene (6), containing only one terminal $PCl_3^+$ unit, with 15. Following termination, the solvent is removed in vacuo to remove the side product halosilane. The polymer is then dissolved in an organic solvent, such as THF, and the halogen atoms is replaced by the addition of an appropriate amount of an amine or metal alkoxide or phenoxide or phenoxide such as $NaOCH_2CF_3$. Isolation of polymer 17 can be accomplished, for example, via a precipitation of the reaction mixture solution in an organic solvent such as THF into water.

Following the same reaction scheme, triblock copolymers of Formula 2A with $y_1=y_2=1$, $R^1$ being a Ph group, $R^2$ and $R^3$ being $CF_3CH_2O$ groups (18) can be prepared by an addition of an appropriate equivalents such as 2.5 of 15 to 16 to terminate the living polymer 16. After the termination, the solvent can be removed in vacuo to remove the side product halosilane. The polymer is then dissolved in a solvent such as THF, and the halogen atoms can be replaced by the addition of an appropriate amount of an amine or metal alkoxide or phenoxide such as $NaOCH_2CF_3$. Isolation of polymer 18 can be accomplished, for example, via a precipitation of the reaction mixture solution in an organic solvent such as THF into water.

Figure 5:
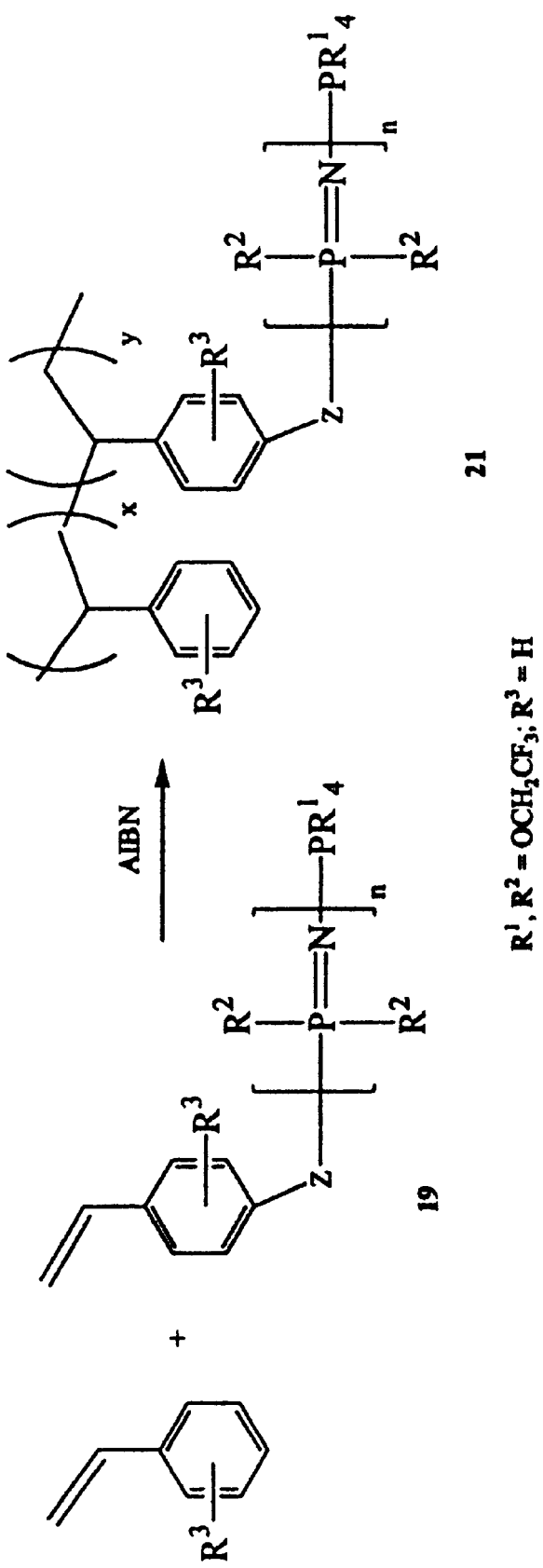
FIG. 5 illustrates one embodiment of the method for the preparation of a polystyrene-graft-polyphosphazene copolymer.
Figure 6:
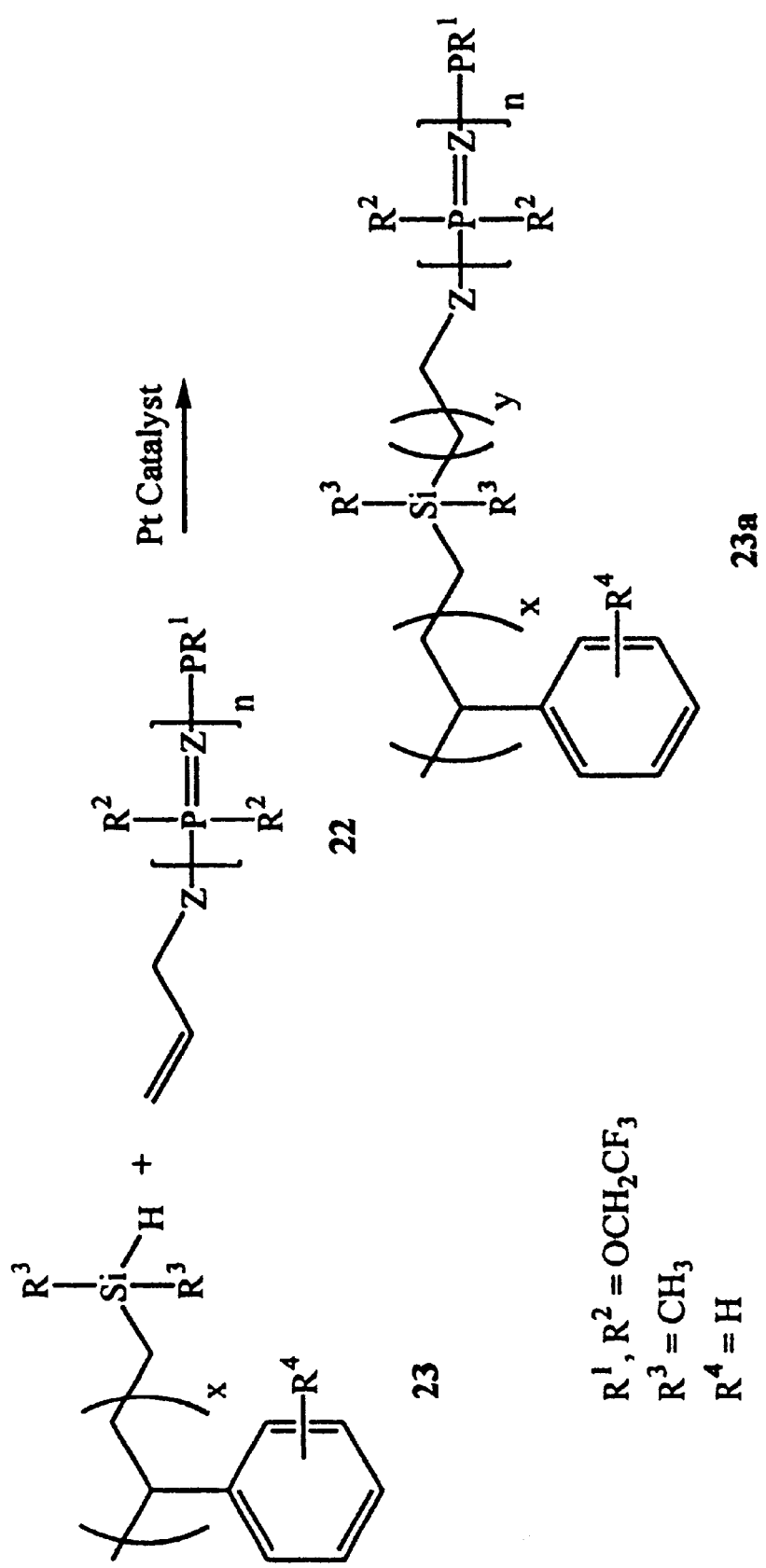
FIG. 6 illustrates one embodiment of the method for the preparation of a polystyrene-block-polyphosphazene copolymer.
Figure 7:
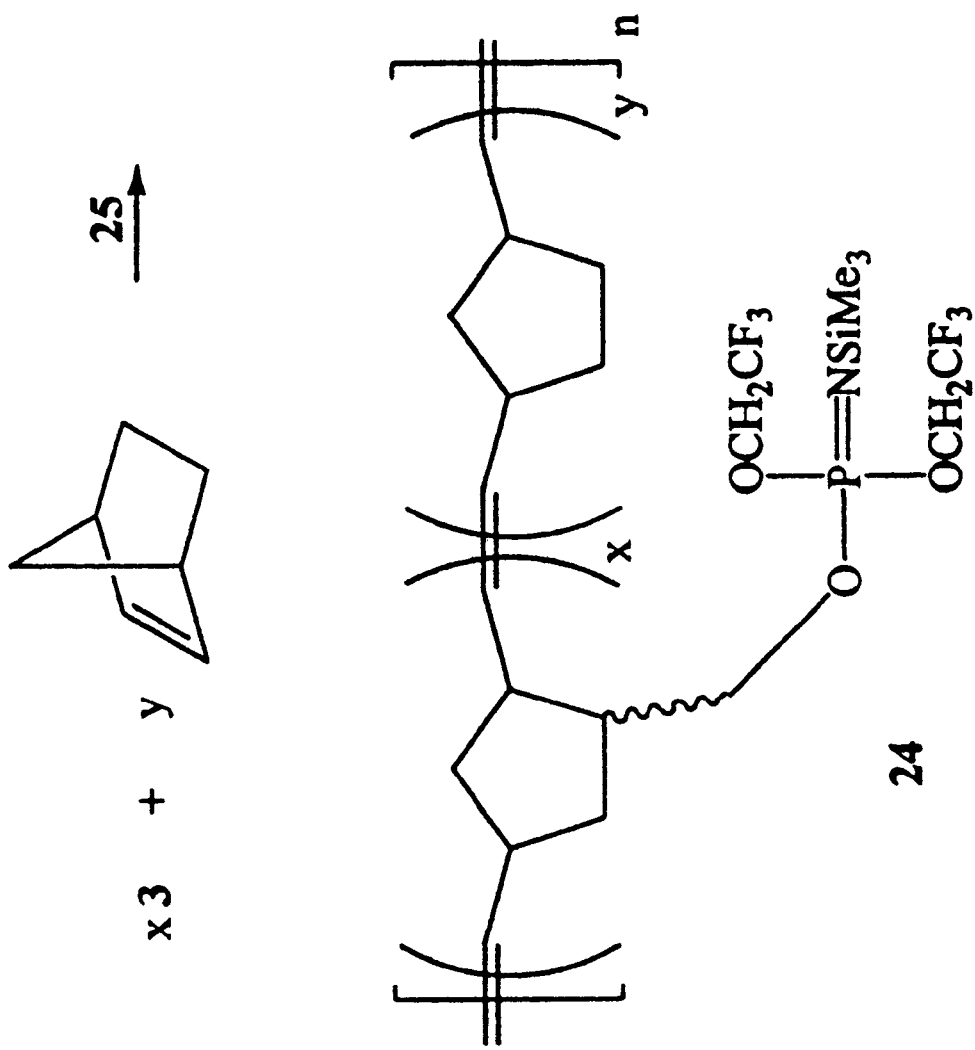
FIG. 7 illustrates one embodiment of the method for the preparation of polynorborne with pendent phosphoranimine groups.
Figure 8:
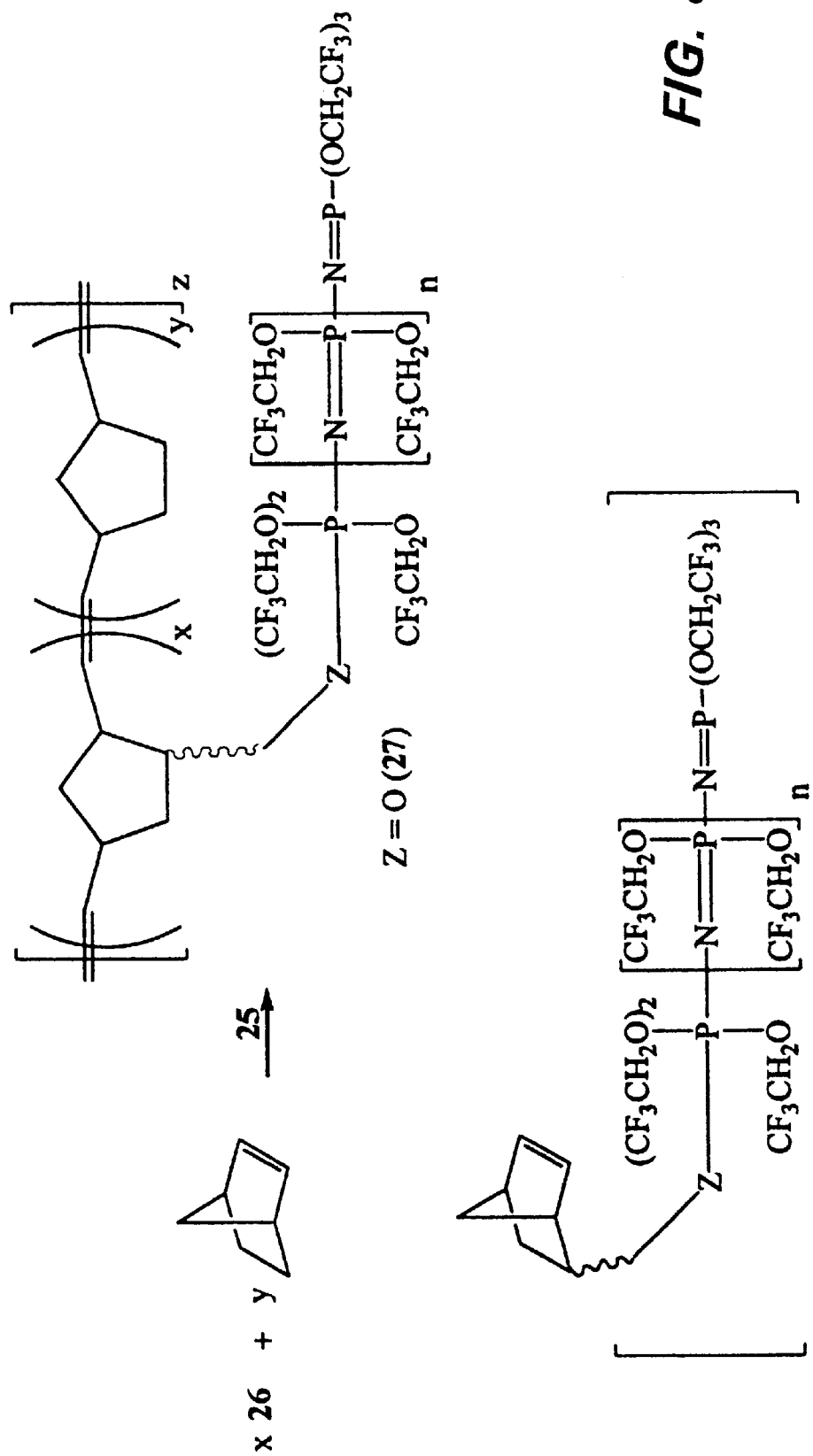
FIG. 8 illustrates one embodiment for the preparation of a polynorbornene-graft-polyphosphazene copolymer.

In another embodiment of the present methods, graft copolymers of Formula 2B with $R^1$ and $R^2$ being $CF_3CH_2O$ groups, $R^3$ being H groups, and Z being an NH group (21) can be prepared by copolymerization of the polyphosphazene with a terminal vinyl aniline functional group (19) with varying ratios of a vinylbenzene such as styrene as outlined in FIG. 5. In one embodiment, vinylaniline terminated polyphosphazenes (19) is produced by treating 4 with an appropriate amount such as 2.0 molar equivalents of a $PX_5$ such as $PCl_5$ at a cold temperature, such as −78° C., in an solvent such as $CH_2Cl_2$ to generate the cationic species 5. Addition of a specific amount of a $X_3P=NSiMe_3$ such as $Cl_3P=NSiMe_3$ to the reaction mixture results in the formation of a living polymer such as poly(dichlorophosphazene) 6, similar to 5, with discrete chain lengths. 6, then, can be quenched with an appropriate amount (e.g., 1.2 equivalents) of $CH_2CHC_6H_4$—NH—$(CF_3CH_2O)_2P=NSiMe_3$ (20). The polymer product can be isolated via precipitation of the reaction mixture solution into water after the halogen atoms are replaced by reaction with an amine or metal alkoxide or phenoxide such as sodium trifluoroethoxide. The polyphosphazenes with a terminal vinyl aniline functional group (19) can be used to produce graft copolymers by refluxing a solution of 19, AIBN, and styrene in an solvent such as THF over a period of time, e.g., 48 hours. The graft copolymers 21 can be isolated, for example, as finely divided solids in good yields after precipitation into water. Poly(methyl methacrylate)-graft-polyphosphazene can be produced by copolymerizing 19 with methyl methacrylated in the presence of AIBN.

Hydrosilylation reactions can be employed to prepare polystyrene-block-polyphosphazenes copolymers. In one embodiment, polymer compositions of Formula 2C with $R^1$ and $R^2$ being $OCH_2CF_3$ groups, $R^3$ being a $CH_3$ group, and $R^4$ being a H group can be prepared as shown in the FIG. 6. First, the olefin-substituted aminopolyphosphazene (22) is prepared, for example according to FIG. 1. 22 then is subjected to hydrosilylation reaction with a hydride terminated polysiloxane such as poly(dimethylsiloxane) (23) in the presence a metal catalyst such as divinyltetramethyldisiloxane:Pt catalyst to give diblock polystyrene-polyphosphazene copolymers (23a).

3. Synthesis of Polymers of Formula 3A–B

A Ring-Opening-Metathesis Polymerization (ROMP) reaction can be utilized to generate polyphosphazene-polynorbornene copolymers of Formula 3A–B. In one embodiment, polymers of Formula 3A with $R^1$, $R^2$, $R^3$, $R^4$, and $R^5$ being H groups, $R^6$ being a $CF_3CH_2$ group, $R^7$ being a $CH_3$ group, and Z being an O group (24) are prepared, as outlined in FIG. 7, via a ROMP reaction of a telechelic norbornenyl polyphosphazene such as 3 in a solvent such as THF. In one embodiment, 3 is subjected to ROMP reaction with norbornene in the presence of a metal catalyst such as Grubb's catalyst $Cl_2(PCy_3)_2Ru$=CHPh (25) with monomer:25 ratios up to 250:1. The reactions can be carried out at high concentrations. Isolation and purification of the phosphoranimine-functionalized polymers of Formula 3A can result in well-defined polynorbornene with pendent phosphoranimine side groups.

ROMP reaction can be utilized to synthesize polymers of Formula 3B. In one embodiment of the present invention, polymer compositions of Formula 3B with $R^1$, $R^2$, $R^3$, $R^4$, and $R^5$ being H groups, $R^6$ and $R^7$ being $CF_3CH_2$ groups, and Z being an O group (27) as outlined in FIG. 8. A monotelechelic norbornenyl polyphosphazene macromonomers such as 26 can copolymerize with an olefin such as norbornene via ROMP using a metal catalyst such as 25 as the initiator in a solvent such as THF. The macromonomers are copolymerized with norbornene. The polymerization reaction can be terminated with an vinyl ether such as ethyl vinyl ether to give the final graft copolymers 27. In one embodiment, a monotelechelic norbornenyl polyphosphazene graft 26 with an average side unit degree of polymerization of 25, is allowed to copolymerize with 98 and 99 mol % norbornene at monomer to initiator ratios of 200:1. The reaction mixtures can be solidified, for example within 40 minutes, following the addition of the initiator, and the polymers 27 can be isolated as off-white solids by precipitation into a hydrocarbon solvent such as hexane. The graft copolymer with 1 and 2 mol % of the polyphosphazene graft is soluble in common organic solvents.

4. Synthesis of Polymers of Formula 4

Figure 9:
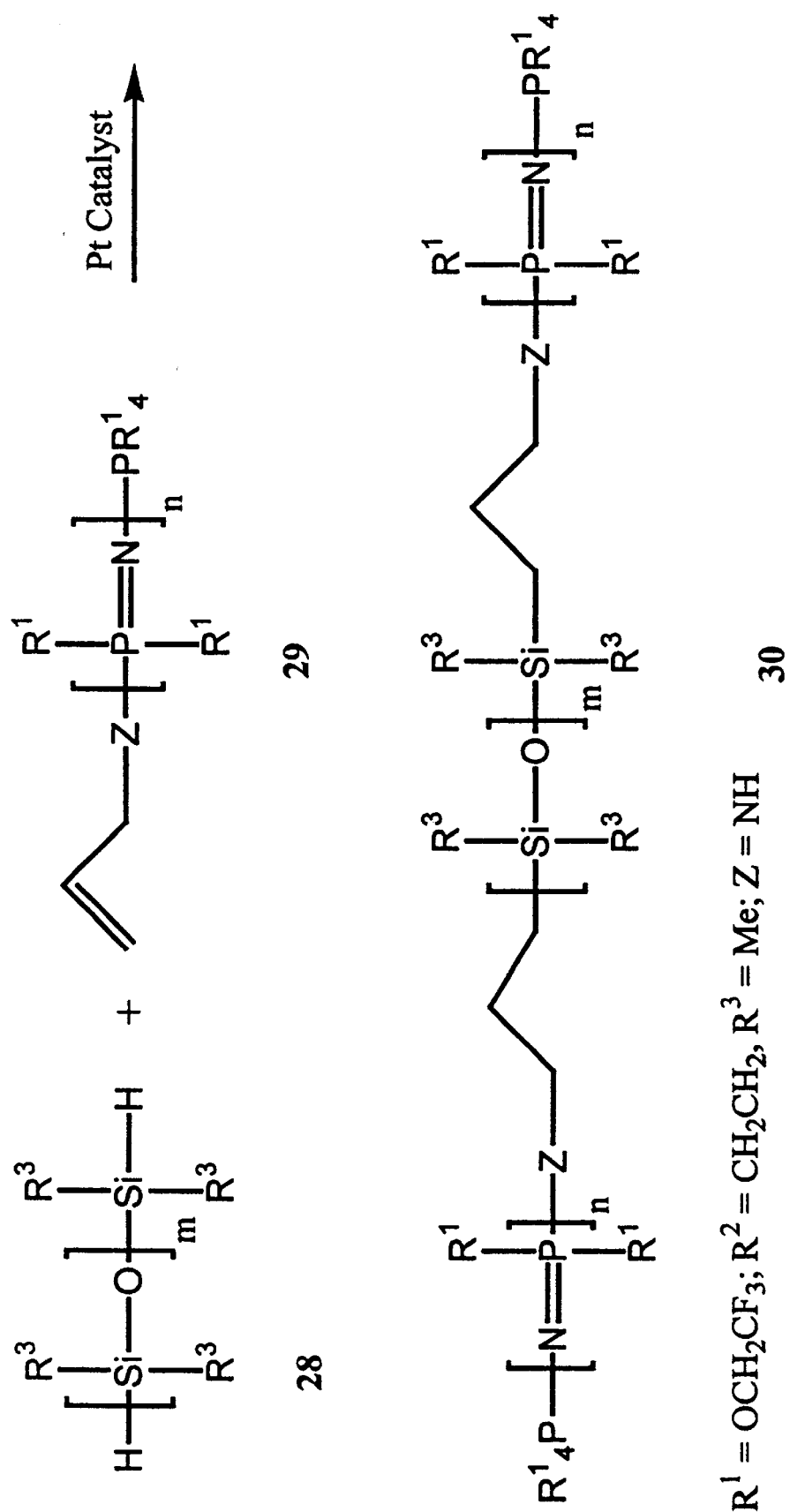
FIG. 9 illustrates one embodiment of the method for the preparation of a polyphosphazene-polysiloxane copolymer.

Hydrosilylation reactions can be employed to polyxiloxane-polyphosphazene copolymers. One embodiment of the present method is shown in FIG. 9. Phosphazene-block-siloxane-block-phosphazene copolymers of Formula 4A with $R^1$ being a $CF_3CH_2$ group, $R^2$ being a $CH_2CH_2CH_2$ group, and $R^3$ being a $CH_3$ group (30) can be produced by reacting a polydimethylsiloxane (28) with allylaminopolyphosphazenes (29). In one embodiment, an appropriate amount such as 2 molar equivalents of 29 undergoes a hydrosilylation reaction with half of the amount of 29 such as 1 molar equivalent 28 in the presence of a metal catalyst such as divinyldisiloxane:Pt catalyst, e. g., at 66° C. The progress of the reaction can be monitored by a spectroscopical means such as infrared spectroscopy. 30 can be isolated, for example as an adhesive, off-white material in good yield.

Figure 10:
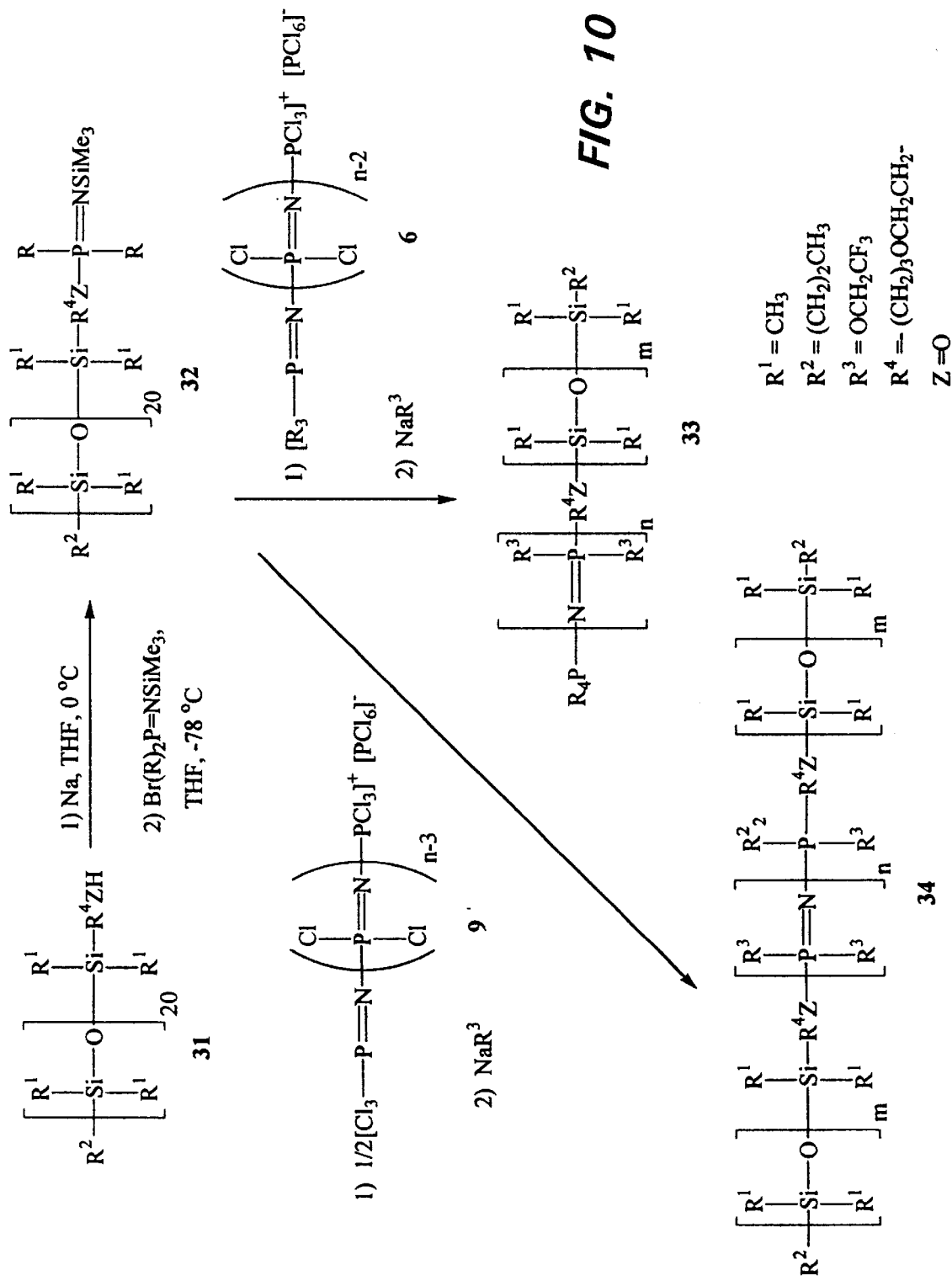
FIG. 10 illustrates one embodiment of the method for the preparation of a polyphosphazene-polysiloxane copolymer.

FIG. 10 depicts a second approach for the preparation of di- and tri-block copolymers which involves the coupling of a monohydroxy polysiloxane with a halophosphoranimine. In one embodiment, polymer compositions of Formula 4B and 4C can be made by reacting a monohydroxy polydimethylsiloxane with halophosphanimes. The resultant siloxane-block-phosphanime can react with living polyphosphazenes to generate either siloxane-block-phosphazene-block or siloxane-block-phosphazene-block-siloxane-block products. In one preferred embodiment, diblock copolymers of Formula 4B with $R^1$ being a $CH_3$ group, $R^2$ being a $CH_3(CH_2)_2$ group, $R^3$ being a $CF_3CH_2O$ group, $R^4$ being a $(CH_2)_3OCH_2CH_2$ group, and Z being an O group (33) can be synthesized by reacting a polysiloxane such as PDMS with a terminal phosphoranimine unit (32) with living polymer such as mono telechelic poly(dichlorophosphazene) 6. 32 was prepared from monohydroxy-PDMS $(CH_3(CH_2)_3[Me_2SiO]_{20}Me_2Si(CH_2)_3$ $OCH_2CH_2OH$, $M_w$=1600) (31) and 2. Replacement of the halogen atoms such as Cl with an amine or metal alkoxide or phenoxide such as sodium trifluoroethoxide generate 33. Any excess PDMS present in the product is easily removed, for example, by successive washing with a solvent such as $CH_2Cl_2$ to yield well-defined polymers with narrow polydispersities. The physical properties of the block copolymers can range, for example, from adhesive, off-white gums to white crystalline solids as the molecular weight of the polyphosphazene block is increased.

Likewise, polymers of Formula 4C with $R^1$ being a $CH_3$ group, $R^2$ being a $CH_3(CH_2)_2$ group, $R^3$ being a $CF_3CH_2O$ group, $R^4$ being a $(CH_2)_3OCH_2CH_2$ group, and Z being an O group (34) can be prepared via termination of the living polymer such as poly(dichlorophosphazene) 9 with a slight excess of 32, followed by a subsequent reaction with an amine or metal alkoxide or phenoxide such as $NaOCH_2CF_3$ to yield the hydrolytically stable, trifluoroethoxy-substituted siloxane-block-phosphazene-block-siloxane copolymers (34).

IV. Applications for the Polymer Compositions

The polymer compositions can be used in a wide variety of applications. Examples include elastomers, optical materials, electrically conductive materials, biomedical materials, compatibilizing agents, surfactants, additives for coatings, and flame retardants.

Compositions of Formula 1B, for example, may be used as optical as well as electrically conductive materials. Compositions of Formula 3A–B may be used as elastomeric materials, biomedical materials, additives for coatings, surfactants, and compatibilizing agents. Furthermore, compositions having haloalkoxy side groups may be used as fire-retardant materials.

The polymers of this application and their preparation can be further understood by the following non-limiting examples.

EXAMPLE 1

Synthesis of $[(CF_3CH_2O)_3P$=$N(Cl_2P$=$N)_nPCl_3]^+$ $[PCl_6]^-$ (6)

To a stirred solution of the initiator 5 was added a solution of $Cl_3P$=$NSiMe_3$ in $CH_2Cl_2$. After a given amount of time (2–24 hours, dependent on monomer to initiator ratios), all of the $Cl_3P$=$NSiMe_3$ had reacted, as confirmed by the disappearance of the $^{31}P$ NMR resonance for $Cl_3P$=$NSiMe_3$ at −54 ppm and the presence of a new resonance at −17.6 ppm for $[Cl_2P$=$N]_n$. $^{31}P$ NMR ($D_2O$) data of 5 are: δ 8.2 (d, 1P, J=29.02, —$PCl_3^+$), −12.46 (d, 1P, J=30.76, $(CF_3CH_2O)_3P$), −14.5, −15.5 (t, 2P, J=40.11, —$Cl_2P$=$N$—$Cl_2P$=$N$—$[Cl_2P$=$N]_n$), −17.6 ppm (br. s, $[Cl_2P$=$N]_n$).

EXAMPLE 2

Synthesis of Monotelechelic Macromonomer $(CF_3CH_2O)_3P$=$N[(CF_3CH_2O)_2P$=$N)]_nP(CF_3CH_2O)_3(OC_8H_{11})$ (8)

To 6 was added a solution of 3 in $CH_2Cl_2$. The reaction mixture was stirred for 8 hours. The volatiles were removed and the residue was redissolved in THF and subsequently treated with a two-fold excess per chlorine atom of 1.5 M sodium trifluoroethoxide in THF. The mixture was stirred at 25° C. for 24 hours to produce the fully substituted product. The polymer was isolated via precipitation into deionized water (3×) and hexane (2×). NMR spectroscopy data of 8 are:

$^1$H NMR (acetone-d$_6$): δ 6.11–5.96 (m, 2H), 4.76–4.26 (m, OCH$_2$CF$_3$), 3.67–3.61 (m, 1H), 3.49–3.44 (m, 1H), 2.91 (br.s, 1H), 2.82–2.79 (m, 2H), 2.40 (br.s, 1H), 1.83–1.76 (m, 1H), 1.38–1.17 (m, 1H), 0.52–0.48 (br.s, 1H); $^{31}$P-NMR (acetone-d$_6$): δ −6.39 (br. s, [(CF$_3$CH$_2$O)$_2$P=N]$_n$), −1.61 (d, J=68.05, Norb-O—(CF$_3$CH$_2$O)$_2$P=N), −0.98 (d, J=51.96, CF$_3$CH$_2$O)$_3$P=N); $^{13}$C NMR (acetone-d$_6$): δ 137.68, 137.31, 136.89, 132.99, 123.82 (q, J=270.58, OCH$_2$CF$_3$), 49.54, 45.31, 44.25, 44.00, 42.87, 43.01, 42.21, 42.18, 40.21, 64.14 (q, J=40.41, OCH$_2$CF$_3$), 63.01, 62.65.

EXAMPLE 3

Synthesis of Ditelechelic Macromonomer (C$_8$H$_{11}$O)(CF$_3$CH$_2$O)$_2$P=N[(CF$_3$CH$_2$O)$_2$P=N)]$_n$P(CF$_3$CH$_2$O)$_3$(OC$_8$H$_{11}$) (10)

A solution of PCl$_5$ (10 mg, 0.048 mmol) in 10 mL of CH$_2$Cl$_2$ or toluene was placed in a flask and was stirred for 1 hour. A solution of Cl$_3$P=NSiMe$_3$ in 2 mL of CH$_2$Cl$_2$ was then added to the flask. The reaction mixture was monitored by $^{31}$P spectroscopy until complete conversion of Cl$_3$P=NSiMe$_3$ to polymer had occurred. A slight excess of 3 (based on the ratio of PCl$_5$ to Cl$_3$P=NSiMe$_3$) was then added, and the solution was stirred for 6–24 hours. All volatiles were removed under reduced pressure and the endcapped poly(dichlorophosphazene) was dissolved in 10 ml of THF. To this THF solution was added a two fold excess, per chlorine atom, of 1.5 M sodium trifluoroethoxide in THF and the reaction mixture was stirred for 24 hours at 25° C. Macromonomer 10 was then recovered via precipitation into deionized water (3×) and hexane (2×). NMR spectroscopy data of 10 are:

$^1$H NMR (acetone-d$_6$): δ 6.21–5.98 (m, 4H, CH=CH), 4.55–4.29 (m, 8H, OCH$_2$CF$_3$), 3.82–3.46 (m, 6H), 2.91 (m, 2H), 2.82 (m, 2H), 2.4 (br.m, 2H), 1.91–1.82 (m, 2H), 1.45–1.19 (m, 6H), 0.52 (m, 2H); $^{31}$P-NMR (acetone-d$_6$): δ −6.27 (s, [(CF$_3$CH$_2$O)$_2$P=N]$_n$), −1.60 (d, J=68.55, R—O—(CF$_3$CH$_2$O)$_2$P=N); $^{13}$C NMR (acetone-d$_6$): δ 138.15, 137.53, 137.02, 133.09, 124.03 (q, J=276.58, OCH$_2$CF$_3$), 64.22 (q, J=37.39, OCH$_2$CF$_3$), 63.19, 62.80, 49.89, 45.47, 44.50, 44.17, 43.03, 42.99, 42.43, 42.30, 40.23.

EXAMPLE 4

PCl$_5$-Induced, Solvent-free Polymerization of Me$_3$SiN=P(Ph)(CF$_3$)Br

Solvent-free polymerizations of Me$_3$SiN=P(Ph)(CF$_3$)Br (0.343 g, 1.0 mmol) with PCl$_5$ (0.02 g, 0.10 mmol) in a 10:1 ratio were performed in reaction vials under an inert atmosphere (Glove Box), with stirring at 35° C. After 30 minutes, the reaction mixture became immobile and THF (ca. 10 ml) was added to dissolve the rubbery material. The solution then was examined by $^{31}$P NMR spectroscopy. The $^{31}$P NMR spectrum showed the complete consumption of Me$_3$SiN=P(Ph)(CF$_3$)Br, as evidenced by the disappearance of the $^{31}$P NMR resonance for Me$_3$SiN=P(Ph)(CF$_3$)Br at −24.5 ppm and the presence of new broad resonances at ca. −10.4 to −3.7 ppm for [N=PPh(CF$_3$)]$_n$ (35). All volatile species were removed at reduced pressure. Polymer 35 was then precipitated into deionized water (3×) and hexane (2×) with a yield of 90%. NMR spectroscopy data of 35 are:

$^{31}$P NMR (CH$_2$Cl$_2$): δ=−10.4 ppm; GPC: M$_n$=1.33×10$^4$ and PDI=1.03; Tg=−19° C. as observed by DSC. $^{31}$P NMR (CDCl$_3$): δ=−10.4 (br. s); $^1$H NMR (CDCl$_3$): δ=7.98–7.73 (m, 4H, C$_6$H$_5$), 7.65–7.44 (m, 6H, C$_6$H$_5$), 4.61–4.19 (m, 6H, OCH$_2$CF$_3$); $^{13}$C NMR (CDCl$_3$): δ=139.53 (d, J=76.4, quat. C$_6$H$_5$), 138.98 (d, J=74.5, C$_6$H$_5$), 135.62 (d, J=91.3, C$_6$H$_5$), 131.14 (d, J=11.3, C$_6$H$_5$), 130.72 (d, J=13.4, C$_6$H$_5$), 129.76 (t, J=17.2, C$_6$H$_5$), 123.64 (d of q, J=187.0, 23.5, CF$_3$), 64.95–62.71 (OCH$_2$CF$_3$).

EXAMPLE 5

Polymerization of Me$_3$SiN=P(CH$_3$)(Ph)Br

To a stirred solution of PCl$_5$ (0.104 g, 0.5 mmol) in CH$_2$Cl$_2$ (10 ml) at 20° C. was added Me$_3$SiN=P(CH$_3$)(Ph)Br (0.065 g, 0.25 mmol) quickly via syringe. The reaction mixture was stirred for 2 hours at this temperature. $^{31}$P NMR spectroscopy of the reaction mixture indicated the presence of the desired initiator species. To the reaction mixture was added a 5-, 10, or 20-fold excess of Me$_3$SiN=P(CH$_3$)(Ph)Br and the reaction was monitored by $^{31}$P NMR until complete consumption of the monomer had taken place to form [CH$_3$PhP=N]$_n$ (36). At this time, a slight excess of 1.5 M sodium trifluoroethoxide was added to the reaction mixture to substitute the terminal bromine atoms. After stirring the reaction mixture at room temperature for 8 hours, the volatiles were removed under reduced pressure. The residue was redissolved in methylene chloride and the polymer precipitated by the addition of hexanes. The positive $^{31}$P NMR chemical shift of this polymer (2.04 ppm) is due to the electron donating methyl substituent, in contrast to the electron withdrawing CF$_3$ group in 5 which causes an upfield shift to −10.4 ppm. NMR spectroscopy data of 36 are:

$^{31}$P NMR (CDCl$_3$): δ=2.04 (br. s); $^1$H NMR (CDCl$_3$): δ=8.02–7.92 (m, 6H, C$_6$H$_5$), 7.46–7.31 (m, 4H, C$_6$H$_5$), 4.52–4.06 (m, 6H, OCH$_2$CF$_3$), 1.82–1.47 (several overlapping doublets, Me). $^{13}$C NMR* (CDCl$_3$): δ=140.48 (d, J=72.6, C$_6$H$_5$), 139.57 (d, J=92.6, C$_6$H$_5$), 138.05 (d, J=72.5, quaternary C$_6$H$_5$), 130.62 (d, J=10.3, C$_6$H$_5$), 129.21 (d, J=10.7, C$_6$H$_5$), 127.26 (t, J=12.0, C$_6$H$_5$), 62.32–60.01 (overlapping quartets, OCH$_2$CF$_3$), 22.49 (d, J=92.4), 22.02 (d, J=90.64), 21.44 (d, J=92.4, Me).* OCH$_2$CF$_3$ carbons hidden under aromatic resonances.

EXAMPLE 6

Synthesis of Polystyryl Polyphosphoranimine Triblock Copolymers

Polystyrene with a terminal phosphine unit (14) was prepared by quenching living polystyrene with Ph$_2$PCl. This species was treated with N$_3$SiMe$_3$ to yield the novel polystyryl phosphoranimine (15) in quantitative yield. This species was used as a macromolecular terminator in the living polymerization of polyphosphazenes. Triblock copolymers 18 were prepared by the addition of 2.5 equivalents of 15 to the living cationic poly(dichlorophosphazenes) 16. The termination process was monitored by $^{31}$P NMR spectroscopy, which showed the disappearance of the PCl$_3^+$ terminal units at −8 ppm and the appearance of the new end-groups at 5 ppm. 1.53 g 18a was isolated (71.5%; M$_n$=8100; PDI=1.21) (Table 1). The NMR spectroscopy data of 18a are:

$^1$H NMR (CD$_3$COCD$_3$): $^1$H NMR: 7.19 (br, 3H, ArH), 6.46 (br, 2H, ArH), 4.51 (d, J=61.98, 0.8H, OCH$_2$CF$_3$), 1.78 ppm (br, 2H, CHCH$_2$), 1.52 ppm (br, 1H, CHCH$_2$); $^{31}$P NMR: −6.87 (br s, [N=P(OCH$_2$CF$_3$)$_2$]$_n$).

EXAMPLE 7

Synthesis of Polystyryl Polyphosphoranimine Diblock Copolymers

Diblock copolymers 17 were prepared by the reaction of polyphosphazenes 6, containing only one terminal PCl$_3^+$ unit, with 15. Following termination, the solvent was removed in vacuo to remove the side product $SiMe_3Cl$. The polymers were then dissolved in THF, and the chlorine atoms were replaced by the addition of a 1.5 M $NaOCH_2CF_3$ solution. Isolation of the polymer was accomplished via precipitation into water. In cases where multiple precipitations did not remove the excess polystyrene phosphoranimine 15, dialysis against THF was employed to remove the homopolymers. The block copolymers 17 were isolated as white, hydrolytically stable materials after purification (Table 1). The NMR data of 17a are:

$^1H$ NMR ($CD_3COCD_3$): $^1H$ NMR: 7.15 (br, 3H, ArH), 6.41 (br, 2H, ArH), 4.63 (d, J=61.28, 2H, $OCH_2CF_3$), 1.47 ppm (br, 2H, $CHCH_2$); 1.28 ppm (br, 1H, $CHCH_2$); $^{31}P$ NMR: δ=−7.11 (br s, $[N=P(OCH_2CF_3)_2]_n$); Yield: 2.47 g, 80.0%; $M_n$=14700; PDI=1.17.

TABLE 1

Block Copolymers Synthesized via Initiation and Termination of Poly(dichlorophosphazene) with Phosphine Terminated Polystyrene (15).

| Polymer | PS Prepolymer[a] | | Phosphazene Prepolymer[b] | Copolymer | | |
|---|---|---|---|---|---|---|
| | $M_n$ | PDI | | Calc $M_n$ | Found $M_n$[a] | PDI[a] |
| 18a | 1600 | 1.09 | 2400 | 5600 | 8100 | 1.21 |
| 18b | 2600 | 1.09 | 4900 | 10100 | 13200 | 1.23 |
| 18c | 5200 | 1.08 | 2400 | 12800 | 14700 | 1.17 |
| 18d | 5200 | 1.08 | 4900 | 15300 | 19000 | 1.19 |
| 17a | 2600 | 1.09 | 2400 | 5000 | 7100 | 1.21 |
| 17b | 2600 | 1.09 | 4900 | 7500 | 8500 | 1.25 |
| 17c | 5200 | 1.08 | 2400 | 7600 | 9300 | 1.13 |
| 17d | 5200 | 1.08 | 4900 | 10100 | 14600 | 1.22 |

[a]Obtained by GPC vs. polystyrene standards.
[b]Calculated from the initial ratio of monomer to initiator at 100% conversion.

EXAMPLE 8

Synthesis of Polystyryl Polyphosphoranimine Graft Copolymers

Graft copolymers 21 were prepared by the copolymerization of vinyl aniline-terminated polyphosphazenes 19 with varying ratios of styrene. 19 was produced by treatment of $(CF_3CH_2O)_3P=NSiMe_3$ with two molar equivalents of $PCl_5$ at −78° C. in $CH_2Cl_2$ to generate the cationic species $[(CF_3CH_2O)_3P=N—PCl_3]^+[PCl_6]^-$ 6. The formation of this salt was confirmed in situ by the presence of two doublets in the $^{31}P$ NMR spectrum for the $N-PCl_3^+$ and $(CF_3CH_2O)_3P=N$ units. This living polymer was then quenched with 1.2 equivalents of $CH_2CHC_6H_4—NH—(CF_3CH_2O)_2P=NSiMe_3$. The termination of the living polymer was monitored by $^{31}P$ NMR spectroscopy which showed the formation of a new peak, from the $CH_2CHC_6H_4—NH—(CF_3CH_2O)_2P=N$ end-group, near 5 ppm and the disappearance of the $PCl_3^+$ resonance at −8 ppm. 19 was isolated via precipitation into water after the chlorine atoms are then replaced by reaction with sodium trifluoroethoxide. The polyphosphazenes 19 were then used to produce graft copolymers by refluxing a solution of 21, AIBN, and styrene in THF for 48 hours. The graft copolymers 21 were isolated as finely divided solids in good yields after precipitation into water (Table 2). The NMR data of 21a are:

$^1H$ NMR ($CD_3COCD_3$): $^1H$ NMR: 7.20 (br, 3H, ArH), 6.49 (br, 2H, ArH), 4.65 (br, 3.2H, $OCH_2CF_3$), 1.68 ppm (br, 2H, $CHCH_2$); 1.36 ppm (br, 1H, $CHCH_2$); $^{31}P$ NMR: δ=−7.13 (br s, $[N=P(OCH_2CF_3)_2]_n$); Yield: 1.48 g, 71.0%; $M_n$=64200; PDI=1.83.

TABLE 2

Graft Copolymers Synthesized via Copolymerization of Styrene and 19

| Polymer | Prepolymer 7 | | wt % of 7 | Copolymer | |
|---|---|---|---|---|---|
| | $M_n$[a] | PDI | | $M_n$[a] | PDI |
| 21a | 7400 | 1.11 | 5 | 64200 | 1.83 |
| 21b | 7400 | 1.11 | 10 | 72500 | 1.64 |
| 21c | 7400 | 1.11 | 15 | 83100 | 1.97 |
| 21d | 10300 | 1.09 | 5 | 80900 | 2.01 |
| 21e | 10300 | 1.09 | 10 | 86100 | 1.87 |
| 21f | 10300 | 1.09 | 15 | 102000 | 1.94 |

[a]Obtained by GPC vs. polystyrene standards.

EXAMPLE 9

Synthesis of Graft Polymers Via ROMP of Norbornene-Functionalized Phosphoranimines Due to the insolubility of monomer 3 in $CH_2Cl_2$ and $CHCl_3$, THF was used as solvent despite its unfavorable Lewis basic properties. Under a $N_2$ atmosphere, a 50 mL round bottom flask containing a magnetic stir bar was charged with 3 (440 mg, 1.0 mmol) and 0.6 mL THF. A solution of Grubbs initiator 25, $(PCy_3)_2Cl_2Ru=CHPh$ (16 mg, 0.020 mmol), in 0.2 mL THF was added to the flask via pipet. The flask was capped and the red/purple reaction mixture stirred for 1.5 hours at room temperature. Within 10 minutes the contents were noticeably thicker. To the flask was added 0.5 mL ethyl vinyl ether and 20 mg of catechol. At low monomer to initiator ratios (50:1), the resultant polymer was soluble in diethyl ether, petroleum ether, methanol, hexanes, THF, and chloroform. Despite the insolubility of polymer 24 in $H_2O$ and methanol at higher monomer to initiator ratios (>100), loss of TMS groups occurred when the polymer was precipitated into polar protic solvents as evidenced by $^1H$ NMR. Polymer 24 readily precipitated out in methanol and were recovered as off-white solids (Table 3). The NMR data of 24 are:

$^1H$ NMR ($CDCl_3$): δ 5.31 (bd, 2H), 4.30 (m, 4H, $OCH_2CF_3$), 4.12 (bm, 1H), 3.86 (bm, 1H), 3.68 (m, 1H), 3.16 (bm, 1H), 3.03 (bm, 1H), 2.88 (bm, 1H), 2.59 (bm, 1H), 2.41 (bm, 1H), 2.22 (bm, 1H), 1.80 (bm, 1H), 1.58 (bm, 1H), 1.29 (m, 1H), 1.20 (bm, 1H), 0.03 (d, 9H, $Si(CH_3)_3$); $^{31}P$ NMR ($CDCl_3$): δ 10.2 (d, 1P).

TABLE 3

Molecular Weight Data for Phosphoranimine-Functionalized Polynorbornenes.

| Polymer | [M]/25 | mol % Norbornene | $M_n \times 10^{-4}$ | | PDI |
|---|---|---|---|---|---|
| | | | (Calculated)[a] | (Found)[b] | |
| 24a | 50 | 0 | 2.20 | 4.60 | 1.22 |
| 24b | 100 | 0 | 4.39 | 4.95 | 1.54 |
| 24c | 250[c] | 0 | 11.0 | 7.13 | 1.45 |
| 24d | 200 | 0 | 8.78 | 8.24 | 1.57 |
| 24e | 200 | 20 | 7.40 | 8.13 | 1.85 |
| 24f | 200 | 40 | 6.02 | 7.87 | 1.76 |
| 24g | 200 | 60 | 4.64 | 7.21 | 1.63 |
| 24h | 200 | 80 | 3.26 | 7.06 | 1.87 |
| 24i | 200 | 90 | 2.57 | 6.63 | 2.87 |
| 24j | 200 | 95 | 2.23 | 4.81 | 1.82 |

TABLE 3-continued

Molecular Weight Data for
Phosphoranimine-Functionalized Polynorbornenes.

| Polymer | [M]/25 | mol %<br>Norbornene | $M_n \times 10^{-4}$<br>(Calculated)[a] | (Found)[b] | PDI |
|---|---|---|---|---|---|
| 24k | 200 | 98 | 2.02 | 2.58 | 1.81 |
| 24l | 200 | 99 | 1.95 | 4.58 | 1.58 |

[a]Calculated from the initial [M]/25 ratios at 100% conversion.
[b]Obtained by GPC versus polystyrene standards.
[c]Polymer was only partially soluble in THF.

EXAMPLE 10

Synthesis of Graft Polymers via ROMP of Monotelechelic Polyphosphazenes

Due to the insolubility of polymer 8 in $CH_2Cl_2$ and $CHCl_3$, THF was used as solvent. Under a $N_2$ atmosphere, a 50 mL round bottom flask containing a magnetic stir bar is charged with 8 (0.25 g) and 2.0 mL THF. A solution of Grubbs initiator (25), $(PCy_3)_2Cl_2Ru{=}CHPh$ (16 mg, 0.020 mmol), in 0.2 mL THF was added to the flask via pipet. The flask was capped and the red/purple reaction mixture stirred for 2 hours at room temperature. Within 40 minutes the contents were noticeably thicker. To the flask was added 0.5 mL ethyl vinyl ether and 20 mg of catechol. At low polymer incorporation, 1–5 mole percents, the resultant polymer 27 was soluble in diethyl ether, petroleum ether, methanol, hexanes, THF, and chloroform. The $^1H$ NMR spectrum of the graft copolymers 27 showed characteristic upfield shifts of the olefinic groups at 5.2–5.6 ppm relative to the monomer (5.9–6.2 ppm). Because exo and endo 5-norbornene-2-methoxy isomers were used for quenching the living polyphosphazene homopolymer to yield macromonomer 8, the polyphosphazene graft 27 possesses both exo and endo configurations. Thus, a complex microstructure was presumed to develop during the polymerization, leading to random head-tail, head-head, and tail-tail additions, in addition to cis and trans vinylene units and meso or racemic dyads (Table 4). Inspection of the $^1H$ and $^{13}C$ NMR spectra confirmed the complexity of the microstructure as evidenced by the many unresolvable and broad multiplet peaks.

TABLE 4

Molecular Weight Data Polynorborne-graft-polyphosphazene.

| Graft<br>Copolymer[a] | Starting<br>Polyphosphazene | mol %<br>26 | [b]$M_n \times 10^{-4}$ | PDI |
|---|---|---|---|---|
| 27a | 26a | 1 | 4.60 | 1.74 |
| 27b | 26a | 2 | 6.21 | 2.04 |
| 27b | 26b | 1 | 4.95 | 1.84 |
| 27b | 26b | 2 | 5.83 | 2.33 |
| 27c | 26c | 1 | 7.13 | 1.85 |
| 27d | 26d | 1 | 4.58 | 1.98 |

[a]Polymerizations run at 200:1.
[b]Obtained by GPC versus polystyrene standards.

EXAMPLE 11

Synthesis of Polyphosphazene-Polysiloxane Block Copolymers (30) via Hydrosilylation Polyphosphazene-block-siloxane-block-phosphazene copolymers 30 were produced by treatment of 28 with monoallyl functional polyphosphazene 29 in the presence of a divinyldisiloxane:Pt catalyst at 66° C. The progress of the reaction was monitored by infrared spectroscopy, which showed the disappearance of the Si—H stretch at 2100 $cm^{-1}$ over a twelve hour period. The polymer was isolated as an adhesive, off-white material in good yield. Analysis of 30 by gel permeation chromatography (GPC) indicated that well-defined block copolymers with polydispersities (Table 5). Further evidence for the structure of 30 was provided by a comparison of the $^1H$ and $^{31}P$ NMR integrations for the respective blocks with the elemental analysis results, which agreed within experimental error. The NMR data of 30a:

$^1H$ NMR ($CD_3COCD_3$): δ=4.63–4.51 (br.s., 64H, [($CF_3CH_2O)_2P{=}N]_8$), 4.37 (t, J=7.19, 8H, —$CH_2NH$— [$(CF_3CH_2O)_2P{=}N$]), 3.42 (br.s., 8H, —$CH_2CH_2CH_2NH$—), 1.60 (br.s., 2H, NH), 0.74 (br.s., 4H, —$SiCH_2CH_2CH_2NH$—), 0.12 (br.s., 486 H, [$Me_2SiO]_{80}Me_2Si$); $^{31}P$ NMR ($CD_3COCD_3$): δ=−7.24 (s, [($CF_3CH_2O)_2P{=}N]_{20}$), −2.43 (d, J=65.76 Hz, —($CF_3CH_2O)_2P{=}N$—); $^{13}C$ NMR ($CD_3COCD_3$): δ=122.23 (q, J=266.78 Hz, $OCH_2CF_3$), 63.72 (q, J=43.02, $OCH_2CF_3$), 24.52 (2C, $CH_2CH_2CH_2$—Si), 25.39 (2C, $CH_2CH_2CH_2$—Si), 13.26 (2C, $CH_2CH_2CH_2$—Si), 0–1.40 (m, 162C, [$Me_2SiO]_{80}Me_2Si$). The calculated elemental analysis data are C, 26.9, H, 5.10, N, 2.70, F, 22.6 and the found ones are C, 27.3, H, 5.80, N, 2.70, F, 22.9.

EXAMPLE 12

Synthesis of Polyphosphazene-Polysiloxane Block Copolymers (33) and (34)

A PDMS with a terminal phosphoranimine unit 32 was prepared from monohydroxy PDMS 31 ($CH_3(CH_2)_3[Me_2SiO]_{20}Me_2Si(CH_2)_3OCH_2CH_2OH$, $M_w$=1600) and $Br(CF_3CH_2O)_2P{=}NSiMe_3$. This species was obtained in good yield as a viscous, colorless oil with a $^{31}P$ NMR resonance at −15 ppm in contrast to the $Br(CF_3CH_2O)_2P{=}NSiMe_3$ resonance which appears at −34 ppm. The lack of a halogen group on 32 enabled it to act as a terminating species in the living polymerization of polyphosphazenes by quenching the cationic ends of the chain. Thus, living poly(dichlorophosphazene) 9 was terminated with a slight excess of 32, followed by subsequent reaction with sodium trifluoroethoxide to yield the hydrolytically stable, trifluoroethoxy-substituted siloxane-block-phosphazene-block-siloxane copolymers 34. Similarly, diblock copolymers 33 were synthesized by termination of living mono telechelic poly(dichlorophosphazene) chains 6 with a slight excess of 32, followed by subsequent reaction with sodium trifluoroethoxide. In all instances, $^{31}P$ NMR spectroscopy was used to monitor the termination of the living polymerization process. This was indicated by the disappearance of the $PCl_3^+$ resonance at +8 ppm, and the subsequent appearance of a new resonance at −2 ppm following the addition of 32. Replacement of the chlorine atoms with sodium trifluoroethoxide was also confirmed by $^{31}P$ NMR spectroscopy which revealed a resonance at −6 ppm for the substituted [($CF_3CH_2O)_2P{=}N]_n$ polymer with no trace of unsubstituted [$Cl_2P{=}N]_n$ at −17 ppm. Any excess PDMS present in the product was easily removed by successive washing with $CH_2Cl_2$ to yield well-defined polymers 33 with narrow polydispersities (Table 5). The physical properties of the block copolymers 33 and 34 ranged from adhesive, off-white gums to white crystalline solids as the molecular weight of the polyphosphazene block increased. The NMR data of 33a are:

$^1H$ NMR ($CD_3COCD_3$): δ=0.024 (br.s., 126H, [$Me_2SiO]_{20}Me_2Si$), 4.79–4.81 (b, 80H, $OCH_2CF_3$); $^{31}P$ NMR (CD$_3$COCD$_3$): δ=-6.13 (s, [(CF$_3$CH$_2$O)$_2$P=N]$_{10}$), -4.24 (d, J=67.92 Hz, —(CF$_3$CH$_2$O)$_2$P=N); $^{13}$C NMR (CD$_3$COCD$_3$): δ=0.23–1.62 (m, 42C, [Me$_2$SiO]$_{20}$Me$_2$Si), 13.87, 13.47 (s, 2C, CH$_2$—Si), 17.99 (s, 1C, CH$_3$), 23.43 (s, 1C, CH$_3$CH$_2$), 24.68, 26.41 (s, 2C, CH$_2$CH$_2$CH$_2$), 61.79, 72.38, 74.02 (s, 3C, CH$_2$—O—CH$_2$CH$_2$—O—), 63.12 (q, 20C, J=38.74 Hz, 20C, OCH$_2$CF$_3$), 123.79 (q, 20C, J=268.92, OCH$_2$CF$_3$). For 34a: $^1$H NMR (CD$_3$COCD$_3$): δ=0.023 (br.s., 252 H, [Me$_2$SiO]$_{20}$Me$_2$Si), 0.97 (br.s., 6H, CH$_3$CH$_2$), 1.14 (br.s., 12H, CH$_2$CH$_2$CH$_2$—), 3.80–3.88 (m, 8H, —CH$_2$CH$_2$O), 4.53 (br.s., 32H, [CF$_3$CH$_2$)$_2$P=N]$_8$), 4.34 (m, 4H, CH$_2$CH$_2$O—[(CF$_3$CH$_2$O)$_2$P=N]$_1$); $^{31}$P NMR (CD$_3$COCD$_3$): δ=-7.50 (s, [(CF$_3$CH$_2$O)$_2$P=N]$_{10}$), -3.84 (d, J=67.92 Hz, —(CF$_3$CH$_2$O)$_2$P=N—); $^{13}$C NMR (CD$_3$COCD$_3$): δ=0.81–2.43 (m, 84C, [Me$_2$SiO]$_{20}$Me$_2$Si), 14.17, 14.66 (s, 4C, CH$_2$—Si), 18.40 (s, 2C, CH$_3$), 23.91 (s, 2C, CH$_3$CH$_2$), 24.93, 26.80 (s, 4C, CH$_2$CH$_2$CH$_2$), 62.15, 72.48, 74.42 (s, 6C, CH$_2$—O—CH$_2$CH$_2$—O—), 63.61 (q, 20C, J=38.74 Hz, 20C, OCH$_2$CF$_3$), 122.71 (q, 20C, J=268.92, OCH$_2$CF$_3$). The calculated elemental analysis data are C, 23.90, H, 3.40, N, 4.30, F, 35.2 and the found ones are C, 24.2, H, 4.0, N, 4.5, F, 35.8.

TABLE 5

Molecular Weight and Molecular Weight Distribution of Di- and Tri-Block Copolymers of Phosphazenes and Siloxanes

| Polymer | Siloxane MW[a] | Phosphazene MW[b] | Copolymer MW Calculated[c] | GPC[d] | PDI[d] |
|---|---|---|---|---|---|
| 30a | 6000 | 2800 | 11600 | 12203 | 1.13 |
| 30b | 6000 | 5200 | 17200 | 20367 | 1.07 |
| 30c | 6000 | 7400 | 19400 | 24363 | 1.17 |
| 34a | 1600 | 2430 | 5630 | 10938 | 1.05 |
| 34b | 1600 | 4800 | 8000 | 14749 | 1.07 |
| 34c | 1600 | 7290 | 10490 | 21698 | 1.09 |
| 33a | 1600 | 9720 | 11320 | 17494 | 1.13 |
| 33b | 1600 | 14580 | 16180 | 28529 | 1.13 |

[a]Reported by Aldrich and Gelest.
[b]Calculated from the initial ratio of monomer to PCl$_5$ initiator at 100% conversion.
[c]According to the starting molecular weights of the individual blocks of phosphazene and siloxane.
[d]Obtained by GPC vs. polystyrene standards.

EXAMPLE 13

Synthesis of Polystyrene-block-Polyphosphazenes (23a)

Olefin-substituted aminopolyphosphazene 22 underwent hydrosilylation reaction with polystyrylhydrodimethylsilane 23 in the presence of a divinyldisiloxane:Pt catalyst to generate 23a.

Those skilled in the art will recognize, or be able to ascertain using no more than routine experimentation, many equivalents to the specific embodiments of the invention described herein. Such equivalents are intended to be encompassed by the following claims.

We claim:

1. A composition comprising a polymer having the formula

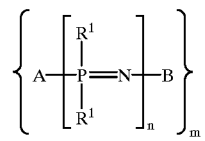

wherein A and B are groupings selected from the group consisting of monomeric P grouping, polymeric P grouping, monomeric Si grouping, polymeric Si grouping, N grouping, O, NH, and alkyl;

wherein R$^1$ is a group selected from the group consisting of CF$_3$CH$_2$O, CCl$_3$CH$_2$O, PhO, alkoxy and amino groups; and wherein n and m are positive integer numbers.

2. The composition in claim 1 wherein the A and B are groupings having formulae

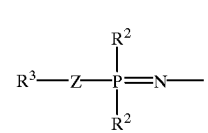

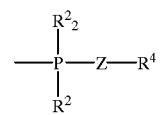

wherein R$^2$ is a group selected the group consisting of CF$_3$CH$_2$O, CCl$_3$CH$_2$O, PhO, alkoxy and amino groups;

wherein Z is either O or NH;

wherein R$^3$ and R$^4$ are groups selected from the group consisting of norbornenyl and terminal alkenyl groups; and wherein n is a positive integer number and m is 1.

3. The composition of claim 1 wherein the A and B are groupings having formulae

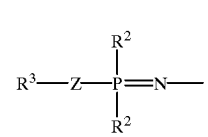

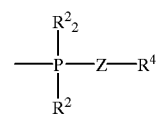

wherein R$^2$ is a group selected the group consisting of CF$_3$CH$_2$O, CCl$_3$CH$_2$O, OPh, alkoxy and amino groups;

wherein Z is O;

wherein R$^3$ and R$^4$ are 1-naphthoxy; and wherein n and m are positive integer numbers.

4. The composition of claim 1 wherein the A and B are groupings having formulae

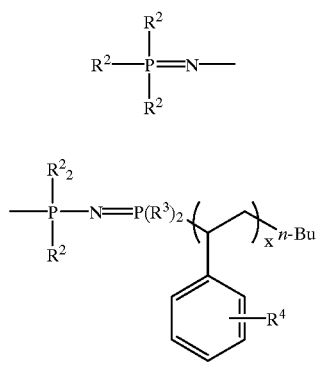

wherein $R^2$ is a group selected from the group consisting of $CF_3CH_2O$, $CCl_3CH_2O$, PhO, alkoxy and amino groups;

wherein $R^3$ is a phenyl or aryl group;

wherein $R^4$ is a group selected from the group consisting of H, $CH_3$, alkyl, alkoxy, phenoxy, aroxy groups; and wherein n and x are positive integer numbers and m is 1.

5. The composition of claim 1 wherein the A and B are groupings having the formulae

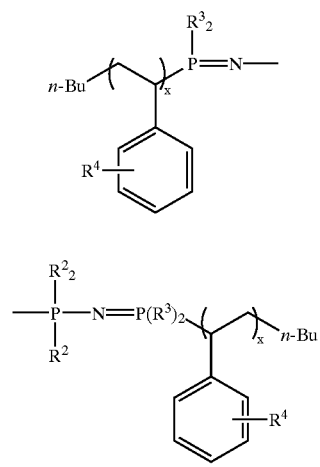

wherein $R^2$ is a group selected from the group consisting of $CF_3CH_2O$, $CCl_3CH_2O$, PhO, alkoxy and amino groups;

wherein $R^3$ is a phenyl or aryl group;

wherein $R^4$ is a group selected from the group consisting of H, $CH_3$, alkyl, alkoxy, phenoxy, and aroxy groups; and wherein n and x are positive integer numbers and m is 1.

6. The composition of claim 1 wherein the A and B are groupings having formulae

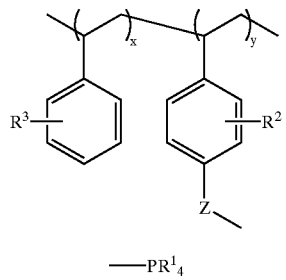

wherein $R^2$ is a group selected from the group consisting of $CF_3CH_2O$, $CCl_3CH_2O$, PhO, alkoxy and amino groups;

wherein $R^3$ and $R^4$ are groups selected from the group consisting of H, $CH_3$, alkyl, alkoxy, phenoxy, and aroxy groups;

wherein Z is O or NH; and wherein n, x and y are positive integer numbers and m is 1.

7. The composition of claim 1 wherein the A and B are groupings having formulae comprising a polymer having the formulae

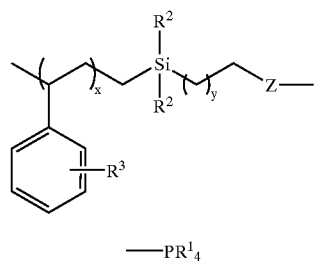

wherein $R^1$ a group selected from the group consisting of PhO, $CF_3CH_2O$, $CCl_3CH_2O$, alkoxy and amino groups;

wherein $R^2$ is a group selected from the group consisting of $CH_3$, $CH_3CH_2$, $CH_3CH_2CH_2$, and $CHCH(CH_3)$ groups;

wherein $R^3$ is in a p, o or m position and is a group selected from the group consisting of H, $CH_3$ and X which is a halogen group;

wherein Z is either O or NH; and wherein n, x, and y are positive integer numbers and m is 1.

8. The composition of claim 7 wherein y is 2;

wherein Z is O;

wherein $R^1$ is $CF_3CH_2O$;

wherein $R^2$ is $CH_3$; and wherein $R^3$ is H.

9. The composition of claim 1 wherein the A and B are groupings having the formulae

A

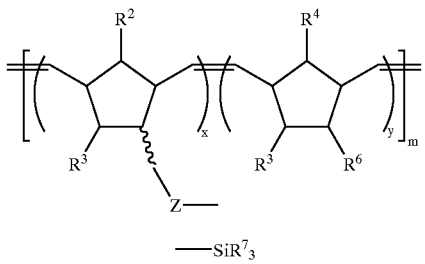

B

—SiR⁷₃ wherein R², R³, R⁴, R⁵, and R⁶ are groups selected from the group consisting of H, CH₃, CH₃CH₂, CH₃CH₂CH₂ and X which is a halo group;

wherein R⁷ is a group selected from the group consisting of CH₃, CH₃CH₂, CH₃CH₂CH₂, and CH₃CH(CH₃) groups;

wherein Z is either O or NH; and wherein n is 1; x, y; and m are positive integers.

10. The composition in claim 9 wherein R¹, R², R³, R⁴, and R⁵ are H groups and wherein Z is O.

11. The composition of claim 1 wherein the A and B are groupings having the formulae

A

R¹₃P=N—

B

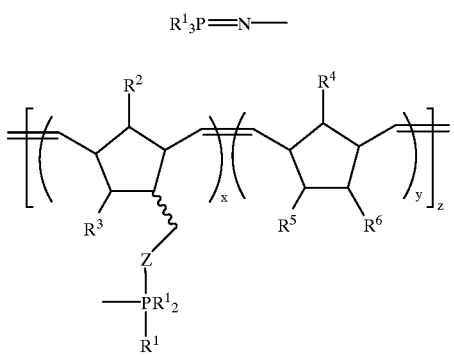

wherein R², R³, R³, R⁵, and R⁶ are groups selected from the group consisting of H, CH₃, and X which is halogen group;

wherein Z is either O or NH; and wherein n, x, y, and z are positive integer numbers and m is 1.

12. The composition of claim 11 wherein R¹ is CF₃CH₂O; wherein R², R³, R⁴, and R⁵ are H groups; and wherein Z is O.

13. The composition of claim 1 wherein the A and B are groupings having the formulae

B

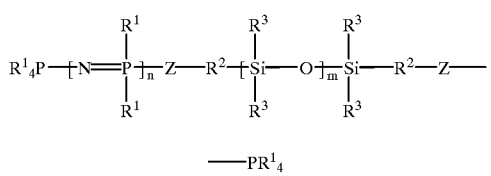

A

—PR¹₄ wherein R² is a group selected from the group consisting of (CH₂CH₂) and (CH₂CH₂CH₂) groups;

wherein R³ is a group selected from the group consisting of CH₃, CH₃CH₂, CH₃CH₂CH₂, and CH₃CH(CH₃) groups; and wherein Z is either O or NH.

14. The composition in claim 13 wherein R² is CH₂CH₂; wherein R³ is CH₃; and wherein Z is NH.

15. The composition of claim 1 wherein A and B are groupings having the formulae

A

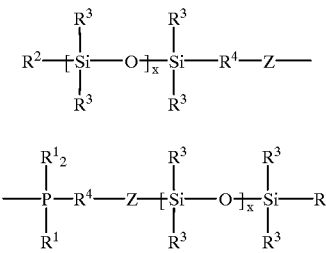

B wherein R² and R³ are groups selected from the group consisting of CH₃, CH₃CH₂, CH₃CH₂CH₂, and CH₃CH(CH₃) groups;

wherein R⁴ is a group selected from the group consisting of CH₂, CH₂CH₂, CH₂CH₂CH₂, and (CH₂)ₓOCH₂CH₂ groups in which x is a integer number selected from the group consisting of 1, 2 and 3;

wherein Z is either O or NH; and wherein n and x are positive integer numbers;

wherein m is 1.

16. The composition in claim 15 wherein R² is CH₃CH(CH₃);

wherein R³ is CH₃;

wherein R⁴ is (CH₂)₃OCH₂CH₂; and wherein Z is O.

17. The composition of claim 1 wherein A and B are groupings having the formulae

B

R¹₄P—

A

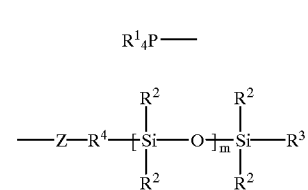

wherein R² and R³ are groups p selected from the group consisting of CH₃, CH₃CH₂, CH₃CH₂CH₂, and CH₃CH(CH₃) groups;

wherein R⁴ is a group selected from the group consisting of CH₂, CH₂CH₂, CH₂CH₂CH₂, and (CH₂)ₓOCH₂CH₂ where x is a number selected from the group consisting of 1, 2 and 3; and wherein Z is either O or NH.

18. The composition in claim 17 wherein R² is a CH₃ group;

wherein R³ is CH₃CH(CH₃);

wherein R⁴ is (CH₂)₃OCH₂CH₂; and wherein Z is O.

19. A method of conducting polymerization of phosphoranimine-containing materials comprising:

a) generating an initiator species by
   i) dissolving a compound of formula $R^1{}_3SiN=PR^2R^3X$ wherein $R^1$ is a group selected from the group consisting of $CH_3$, $CH_3CH_2$, $CH_3CH_2CH_2$ and $CH_3CH(CH_3)$ groups, $R^2$ is an alkyl group, $R^3$ is a phenyl group, and X is a halogen group in an organic solvent to make a solution of the compound; and
   ii) adding to the solution a $PX_5$ where X is a halogen group;
b) adding a phosphoranimine compound containing a functional group to the solution containing the initiator species to start a polymerization reaction; and
c) terminating the polymerization reaction.

20. The method in claim 19 wherein the functional group is selected from the group consisting of norbornenyl, vinyl anilinyl, allyl amino, polysiloxy, and polystyryl.

21. The method in claim 20 wherein the functional group is a norbornenyl or allyl amino group.

22. A method of preparing a polyphosphazene-containing polymer comprising
   a) preparing a polystyryl phosphoranimine;
   b) dissolving the polystyryl phosphoranimine in an organic solvent to make a polystyryl phosphoranimine solution;
   c) adding to the polystyryl phosphoranimine solution a $PX_5$ wherein X is a halogen group to generate an initiating species;
   d) adding to the initiating species a $X_3P=NSiR_3$ wherein X is a halogen group and R is an alkyl group selected from the group consisting of $CH_3$, $CH_3CH_2$, $CH_3CH_2CH_2$, and $CH_3CH(CH_3)$; and
   e) terminating the polymerization reaction.

23. The method of claim 22 wherein the $X_3P=NSiR_3$ is $Cl_3P=NSiMe_3$.

24. A method of preparing polystyrylhydrosilyl polyphosphazene copolymers comprising:
   a) preparing a terminal-olefin substituted aminopolyphosphazene compound;
   b) preparing a polystyryl hydrosilane compound; and
   c) reacting the polystyrylhydrosilane compound with the terminal-olefin substituted aminopolyphosphazene compound in the presence of a catalytic amount of a metal compound.

25. The method in claim 24 wherein the metal compound comprises a metal selected from the group consisting of Ru, Rh, Pd, Pt, Ni, Co, Ir, Au, Fe, Ag, Os and combinations thereof.

26. The method in claim 25 wherein the metal compound comprises a metal selected from the group consisting of Ru, Rh, Pd, Pt, Co, Ir, Os, and combinations thereof.

27. The method in claim 26 wherein the metal compound is divinyldisiloxane platinum;
   wherein the terminal olefin group is a group selected from the group consisting of allyl and vinyl groups; and
   wherein the polystyrylhydrosilane compound is polystyryldimethylhydrosilane.

28. A method of preparing polyolefin and polyphosphazene copolymers comprising:
   a) preparing a monotelechelic norbornenyl polyphosphazene; and
   b) reacting the norbornenyl polyphosphazene with an organic compound having a norbornene structure in the presence of a metal compound which comprises a metal selected from the group consisting of Ru, Pt, Fe, Os, Pd, Ni, Co, Rh, Ir and combinations thereof.

29. The method in claim 28 wherein the metal is selected from the group consisting of Ru, Rh, Pd, Co, Ni, Fe and combinations thereof.

30. The method in claim 29 wherein the metal compound is $(PCy_3)_2Cl_2Ru=CHPh$; and wherein the organic compound is norbornene.

31. A method of preparing a polysilane and polyphosphazene copolymer comprising:
   a) preparing a phosphoranimine of the formula $R^1R^2P=NSiR^3$ wherein $R^1$ is a group selected from the group consisting of $CH_2CHCH_2NH$, $CH_2CHNH$, $CH_2CH(CH_3)NH$, and p-$CH_2CHPh—NH$, $CH_2CHCH_2O$, $CH_2CHO$, $CH_2CH(CH_3)O$, and p-$CH_2CHPh—O$ groups and $R^2$ is a group selected from the group consisting of PhO, $CX_3CH_2O$ where X is a halogen group, $CF_3$, 1-naphthoxy, and alkoxy groups and $R^3$ is a group selected from the group consisting of $CH_3$, $CH_3CH_2$, $CH_3CH_2CH_2$, and $CH_3CH(CH_3)$ groups;
   b) reacting the phosphoranimine with a multi-equivalent $PX_5$ wherein X is a halogen group to generate a living polyphosphazene species; and
   c) reacting a dihydropolysilane with the polyphosphazene species in the presence of a compound or colloid of a metal selected from the group consisting of Ru, Rh, Pd, Pt, Ni, Co, Ir, Au, Fe, Ag, Os and combinations thereof.

32. The method in claim 31 wherein the metal is Pt;
   wherein the polysilane is a polysiloxane;
   wherein the halogen group is Cl; and
   wherein the $R^2$ group is $CF_3CH_2O$ and $R^3$ is a group selected from the group consisting of $CH_3$ and $CH_3CH_2$.

33. The method in claim 31 wherein the $R^1$ group is an allyl group, the $R^2$ group is $CF_3CH_2O$, and the $R^3$ group is $CH_3$.

34. An article of manufacture comprising the composition of claim 1.

35. The article of claim 34 wherein the composition provides a function selected from the group consisting of an elastomer, a linear optical material, a nonlinear optical material, an electrically conductive material, a biomedical material, a compatibilizing agent, a surfactant, an additives for coatings, and a flame retardant.

* * * * *